US009450846B1

(12) United States Patent
Huang et al.

(10) Patent No.: US 9,450,846 B1
(45) Date of Patent: Sep. 20, 2016

(54) SYSTEM AND METHOD FOR TRACKING PACKETS IN A NETWORK ENVIRONMENT

(71) Applicant: CISCO TECHNOLOGY, INC., San Jose, CA (US)

(72) Inventors: Wei-Jen Huang, Burlingame, CA (US); Chih-Tsung Huang, Burlingame, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 333 days.

(21) Appl. No.: 13/653,814

(22) Filed: Oct. 17, 2012

(51) Int. Cl.
*H04L 12/26* (2006.01)
*H04J 3/06* (2006.01)

(52) U.S. Cl.
CPC ......... *H04L 43/0858* (2013.01); *H04L 43/106* (2013.01); *H04L 43/12* (2013.01); *H04J 3/0682* (2013.01); *H04L 43/0864* (2013.01)

(58) Field of Classification Search
CPC ........... H04L 43/0858; H04L 43/0864; H04L 43/106; H04L 43/12; H04L 1/24; H04L 41/00; H04L 43/00; H04J 3/0682; H04Q 11/04
USPC .................................................. 370/241, 242
See application file for complete search history.

(56) References Cited

U.S. PATENT DOCUMENTS

| 4,006,320 | A | 2/1977 | Markl |
| 4,486,877 | A | 12/1984 | Turner |
| 4,569,042 | A | 2/1986 | Larson |
| 4,630,268 | A | 12/1986 | Rodenbaugh |
| 4,907,277 | A | 3/1990 | Callens et al. |
| 5,010,544 | A | 4/1991 | Chang et al. |
| 5,014,265 | A | 5/1991 | Hahne et al. |
| 5,121,382 | A | 6/1992 | Yang et al. |
| 5,159,592 | A | 10/1992 | Perkins |
| 5,243,342 | A | 9/1993 | Kattemalalavadi et al. |
| 5,265,092 | A | 11/1993 | Soloway et al. |
| 5,274,643 | A | 12/1993 | Fisk |

(Continued)

FOREIGN PATENT DOCUMENTS

| WO | WO 2008/010918 | 1/2008 |
| WO | WO 2009/014967 | 1/2009 |

OTHER PUBLICATIONS

IEEE Instrumentation and Measurement Society, IEEE Standard for a Precision Clock Synchronization Protocol for Networked Measurement and Control Systems, Jul. 24, 2008, IEEE Std 1588-2008, pp. 26-36, 42-44, 124-132.*

(Continued)

*Primary Examiner* — Un C Cho
*Assistant Examiner* — Shah Rahman
(74) *Attorney, Agent, or Firm* — Patent Capital Group

(57) ABSTRACT

A method is provided in one example embodiment that includes transmitting a message from a first port to a second port, recording a timestamp of the message at each clock between the first port and the second port, and transmitting a first follow-up message from a first port to a second port to collect timestamps at each clock between the first port and the second port. The method further includes transmitting a loopback message from the second port to the first port, recording timestamps of the loopback message at each clock between the second port and the first port, and transmitting a second follow-up message from the second port to the first port to collect and append the timestamps of the loopback message at each clock.

23 Claims, 9 Drawing Sheets

(56) References Cited

U.S. PATENT DOCUMENTS

| | | |
|---|---|---|
| 5,321,694 A | 6/1994 | Chang et al. |
| 5,341,477 A | 8/1994 | Pitkin et al. |
| 5,343,461 A | 8/1994 | Barton et al. |
| 5,353,283 A | 10/1994 | Tsuchiya |
| 5,371,852 A | 12/1994 | Attanasio et al. |
| 5,394,402 A | 2/1995 | Ross |
| 5,416,842 A | 5/1995 | Aziz |
| 5,422,876 A | 6/1995 | Turudic |
| 5,426,637 A | 6/1995 | Derby et al. |
| 5,430,715 A | 7/1995 | Corbalis et al. |
| 5,430,727 A | 7/1995 | Callon |
| 5,450,394 A | 9/1995 | Gruber |
| 5,450,449 A | 9/1995 | Kroon |
| 5,452,294 A | 9/1995 | Natarajan |
| 5,459,837 A | 10/1995 | Caccavale |
| 5,473,599 A | 12/1995 | Li et al. |
| 5,477,531 A | 12/1995 | McKee et al. |
| 5,491,692 A | 2/1996 | Gunner et al. |
| 5,500,851 A | 3/1996 | Kozaki et al. |
| 5,500,860 A | 3/1996 | Perlman et al. |
| 5,509,123 A | 4/1996 | Dobbins et al. |
| 5,519,704 A | 5/1996 | Farinacci et al. |
| 5,521,907 A | 5/1996 | Ennis et al. |
| 5,555,256 A | 9/1996 | Calamvokis |
| 5,561,669 A | 10/1996 | Lenney et al. |
| 5,563,875 A | 10/1996 | Hefel et al. |
| 5,594,732 A | 1/1997 | Bell et al. |
| 5,602,918 A | 2/1997 | Chen et al. |
| 5,604,803 A | 2/1997 | Aziz |
| 5,617,417 A | 4/1997 | Sathe et al. |
| 5,617,421 A | 4/1997 | Chin et al. |
| 5,621,721 A | 4/1997 | Vatuone |
| 5,623,492 A | 4/1997 | Teraslinna |
| 5,623,605 A | 4/1997 | Keshav et al. |
| 5,642,515 A | 6/1997 | Jones et al. |
| 5,650,993 A | 7/1997 | Lakshman et al. |
| 5,651,002 A | 7/1997 | Van Seters et al. |
| 5,659,542 A | 8/1997 | Bell et al. |
| 5,673,265 A | 9/1997 | Gupta et al. |
| 5,675,741 A | 10/1997 | Aggarwal et al. |
| 5,689,566 A | 11/1997 | Nguyen |
| 5,699,478 A | 12/1997 | Nahumi |
| 5,699,485 A | 12/1997 | Shoham |
| 5,708,502 A | 1/1998 | Denton et al. |
| 5,715,399 A | 2/1998 | Bezos |
| 5,740,171 A | 4/1998 | Mazzola et al. |
| 5,740,176 A | 4/1998 | Gupta et al. |
| 5,742,604 A | 4/1998 | Edsall et al. |
| 5,764,636 A | 6/1998 | Edsall |
| 5,793,763 A | 8/1998 | Mayes et al. |
| 5,812,528 A | 9/1998 | VanDervort |
| 5,819,089 A | 10/1998 | White |
| 5,835,494 A | 11/1998 | Hughes et al. |
| 5,838,994 A | 11/1998 | Valizadeh |
| 5,850,388 A | 12/1998 | Anderson et al. |
| 5,867,666 A | 2/1999 | Harvey |
| 5,870,397 A | 2/1999 | Chauffour et al. |
| 5,870,557 A | 2/1999 | Bellovin et al. |
| 5,884,010 A | 3/1999 | Chen et al. |
| 5,894,556 A | 4/1999 | Grimm et al. |
| 5,905,871 A | 5/1999 | Buskens et al. |
| 5,917,820 A | 6/1999 | Rekhter |
| 5,918,017 A | 6/1999 | Attanasio et al. |
| 5,918,019 A | 6/1999 | Valencia |
| 5,931,961 A | 8/1999 | Ranganathan et al. |
| 5,943,347 A | 8/1999 | Shepard |
| 5,983,265 A | 11/1999 | Martino, II |
| 5,987,011 A | 11/1999 | Toh |
| 5,991,809 A | 11/1999 | Kriegsman |
| 6,003,079 A | 12/1999 | Friedrich et al. |
| 6,006,264 A | 12/1999 | Colby et al. |
| 6,009,081 A | 12/1999 | Wheeler et al. |
| 6,018,516 A | 1/2000 | Packer |
| 6,023,455 A | 2/2000 | Takahashi |
| 6,023,733 A | 2/2000 | Periasamy et al. |
| 6,031,846 A | 2/2000 | Gurusami et al. |
| 6,032,194 A | 2/2000 | Gai et al. |
| 6,041,352 A | 3/2000 | Burdick et al. |
| 6,058,102 A * | 5/2000 | Drysdale et al. ............ 370/252 |
| 6,061,454 A | 5/2000 | Malik et al. |
| 6,070,190 A | 5/2000 | Reps et al. |
| 6,078,590 A | 6/2000 | Farinacci et al. |
| 6,078,956 A | 6/2000 | Bryant et al. |
| 6,088,717 A | 7/2000 | Reed et al. |
| 6,094,562 A | 7/2000 | Zhong |
| 6,101,180 A | 8/2000 | Donahue et al. |
| 6,104,695 A | 8/2000 | Wesley et al. |
| 6,115,711 A | 9/2000 | White |
| 6,115,752 A | 9/2000 | Chauhan |
| 6,118,765 A | 9/2000 | Phillips |
| 6,118,796 A | 9/2000 | Best et al. |
| 6,185,203 B1 | 2/2001 | Berman |
| 6,192,036 B1 | 2/2001 | Buhler et al. |
| 6,230,271 B1 | 5/2001 | Wadlow et al. |
| 6,252,851 B1 | 6/2001 | Siu et al. |
| 6,275,471 B1 | 8/2001 | Bushmitch et al. |
| 6,278,687 B1 | 8/2001 | Hunneyball |
| 6,286,045 B1 | 9/2001 | Griffiths et al. |
| 6,317,775 B1 | 11/2001 | Coile et al. |
| 6,337,861 B1 | 1/2002 | Rosen |
| 6,356,545 B1 | 3/2002 | Vargo et al. |
| 6,363,477 B1 | 3/2002 | Fletcher et al. |
| 6,389,006 B1 | 5/2002 | Bialik |
| 6,445,717 B1 | 9/2002 | Gibson et al. |
| 6,446,121 B1 | 9/2002 | Shah et al. |
| 6,510,150 B1 | 1/2003 | Ngo |
| 6,515,967 B1 | 2/2003 | Wei et al. |
| 6,526,044 B1 | 2/2003 | Cookmeyer et al. |
| 6,535,490 B1 | 3/2003 | Jain |
| 6,563,796 B1 | 5/2003 | Saito |
| 6,578,066 B1 | 6/2003 | Logan et al. |
| 6,584,438 B1 | 6/2003 | Manjunath et al. |
| 6,614,781 B1 | 9/2003 | Elliott et al. |
| 6,628,624 B1 | 9/2003 | Mahajan et al. |
| 6,665,637 B2 | 12/2003 | Bruhn |
| 6,680,921 B1 | 1/2004 | Svanbro et al. |
| 6,687,225 B1 | 2/2004 | Kawarai et al. |
| 6,687,360 B2 | 2/2004 | Kung et al. |
| 6,700,874 B1 | 3/2004 | Takihiro et al. |
| 6,725,191 B2 | 4/2004 | Mecayten |
| 6,731,609 B1 | 5/2004 | Hirni et al. |
| 6,741,600 B1 | 5/2004 | Weiss et al. |
| 6,757,654 B1 | 6/2004 | Westerlund et al. |
| 6,765,881 B1 | 7/2004 | Rajakarunanayake |
| 6,775,703 B1 | 8/2004 | Burns et al. |
| 6,785,261 B1 | 8/2004 | Schuster et al. |
| 6,798,739 B1 | 9/2004 | Lee |
| 6,804,244 B1 | 10/2004 | Anandakumar et al. |
| 6,836,804 B1 | 12/2004 | Jagadeesan |
| 6,839,353 B1 | 1/2005 | DeJager |
| 6,845,091 B2 | 1/2005 | Ogier et al. |
| 6,901,048 B1 | 5/2005 | Wang et al. |
| 6,917,983 B1 | 7/2005 | Li |
| 6,940,821 B1 | 9/2005 | Wei et al. |
| 6,944,132 B1 | 9/2005 | Aono et al. |
| 6,947,381 B2 | 9/2005 | Wen et al. |
| 7,013,267 B1 | 3/2006 | Huart et al. |
| 7,024,257 B2 | 4/2006 | Pearce et al. |
| 7,039,716 B1 | 5/2006 | Jagadeesan |
| 7,047,190 B1 | 5/2006 | Kapilow |
| 7,068,607 B2 | 6/2006 | Partain et al. |
| 7,069,034 B1 | 6/2006 | Sourour |
| 7,072,968 B2 | 7/2006 | Mikami et al. |
| 7,099,820 B1 | 8/2006 | Huart et al. |
| 7,133,368 B2 | 11/2006 | Zhang et al. |
| 7,143,184 B1 | 11/2006 | Shah et al. |
| 7,212,517 B2 | 5/2007 | Dzik |
| 7,283,474 B1 | 10/2007 | Bergenwall |
| 7,286,467 B1 | 10/2007 | Sylvain |
| 7,289,454 B2 | 10/2007 | Bovo et al. |
| 7,310,334 B1 | 12/2007 | FitzGerald et al. |
| 7,336,620 B2 | 2/2008 | Bennett |
| 7,352,700 B2 | 4/2008 | Chan et al. |
| 7,352,705 B1 | 4/2008 | Adhikari et al. |

(56) References Cited

U.S. PATENT DOCUMENTS

| | | |
|---|---|---|
| 7,406,034 B1 | 7/2008 | Cometto et al. |
| 7,417,993 B1 | 8/2008 | Ebergen et al. |
| 7,426,577 B2 | 9/2008 | Bardzil et al. |
| 7,457,877 B1 | 11/2008 | Shah et al. |
| 7,483,370 B1 | 1/2009 | Dayal et al. |
| 7,496,044 B1 | 2/2009 | Wing |
| 7,519,006 B1 | 4/2009 | Wing |
| 7,525,949 B1 | 4/2009 | Rampal et al. |
| 7,564,858 B1 | 7/2009 | Moncada-Elias et al. |
| 7,643,430 B2 | 1/2010 | Morandin |
| 7,660,314 B2 | 2/2010 | Wybenga et al. |
| 7,672,227 B2 | 3/2010 | Santoso et al. |
| 7,729,267 B2 | 6/2010 | Oran et al. |
| 7,760,735 B1 | 7/2010 | Chen et al. |
| 7,817,580 B2 | 10/2010 | Jain et al. |
| 7,864,712 B2 | 1/2011 | Khan et al. |
| 7,870,611 B2 | 1/2011 | Ishikawa |
| 7,886,080 B2 | 2/2011 | Sajassi et al. |
| 7,944,470 B2 | 5/2011 | Foster et al. |
| 7,969,894 B2 | 6/2011 | Mangal |
| 8,065,317 B2 | 11/2011 | Wang et al. |
| 8,116,213 B2 | 2/2012 | Krygowski |
| 8,174,996 B2 | 5/2012 | Omar |
| 8,244,909 B1 | 8/2012 | Hanson et al. |
| 8,279,759 B1* | 10/2012 | Jones ............................ 370/248 |
| 8,291,077 B2 | 10/2012 | I'Anson |
| 8,582,467 B2 | 11/2013 | Hirota et al. |
| 9,166,681 B2* | 10/2015 | Cavaliere ............... H04B 10/07 |
| 9,203,725 B2* | 12/2015 | Ronchetti ............ H04L 43/0858 |
| 9,252,903 B2* | 2/2016 | Flinn ................... H04L 43/0852 |
| 2002/0003775 A1 | 1/2002 | Nakano et al. |
| 2002/0067693 A1 | 6/2002 | Kodialam et al. |
| 2002/0073375 A1 | 6/2002 | Hollander |
| 2002/0083186 A1 | 6/2002 | Stringer |
| 2002/0196802 A1 | 12/2002 | Sakov et al. |
| 2003/0053419 A1 | 3/2003 | Kanazawa et al. |
| 2003/0072269 A1 | 4/2003 | Teruhi et al. |
| 2003/0097438 A1 | 5/2003 | Bearden et al. |
| 2003/0110276 A1 | 6/2003 | Riddle |
| 2003/0137972 A1 | 7/2003 | Kowalewski et al. |
| 2003/0142680 A1 | 7/2003 | Oguchi |
| 2003/0163772 A1 | 8/2003 | Jaworski |
| 2003/0165114 A1 | 9/2003 | Kusama et al. |
| 2003/0208616 A1 | 11/2003 | Laing et al. |
| 2003/0219022 A1 | 11/2003 | Dillon et al. |
| 2003/0220971 A1 | 11/2003 | Kressin |
| 2003/0225549 A1 | 12/2003 | Shay |
| 2004/0008715 A1 | 1/2004 | Barrack et al. |
| 2004/0052257 A1 | 3/2004 | Abdo et al. |
| 2004/0052259 A1* | 3/2004 | Garcia ............... H04L 12/2602 370/392 |
| 2004/0073690 A1 | 4/2004 | Hepworth et al. |
| 2004/0114539 A1 | 6/2004 | Beshai et al. |
| 2004/0125965 A1 | 7/2004 | Alberth et al. |
| 2004/0170163 A1 | 9/2004 | Yik et al. |
| 2004/0184323 A1 | 9/2004 | Mori et al. |
| 2004/0193709 A1 | 9/2004 | Selvaggi et al. |
| 2004/0218617 A1 | 11/2004 | Sagfors |
| 2004/0223458 A1 | 11/2004 | Gentle |
| 2004/0240431 A1 | 12/2004 | Makowski et al. |
| 2004/0252646 A1 | 12/2004 | Adhikari et al. |
| 2005/0036519 A1 | 2/2005 | Balakrishnan et al. |
| 2005/0105474 A1 | 5/2005 | Metzler |
| 2005/0111487 A1 | 5/2005 | Matta et al. |
| 2005/0117576 A1 | 6/2005 | McDysan et al. |
| 2005/0152406 A2 | 7/2005 | Chauveau |
| 2005/0216599 A1 | 9/2005 | Anderson et al. |
| 2005/0220123 A1 | 10/2005 | Wybenga et al. |
| 2005/0226172 A1 | 10/2005 | Richardson |
| 2005/0243733 A1 | 11/2005 | Crawford et al. |
| 2005/0246041 A1 | 11/2005 | Kreifeldt et al. |
| 2005/0259597 A1 | 11/2005 | Benedetto et al. |
| 2005/0265356 A1 | 12/2005 | Kawarai et al. |
| 2005/0283639 A1 | 12/2005 | Le Pennec et al. |
| 2005/0286419 A1 | 12/2005 | Joshi et al. |
| 2005/0286436 A1 | 12/2005 | Flask |
| 2006/0007869 A1 | 1/2006 | Hirota et al. |
| 2006/0018333 A1 | 1/2006 | Windisch et al. |
| 2006/0041431 A1 | 2/2006 | Maes |
| 2006/0098586 A1 | 5/2006 | Farrell et al. |
| 2006/0104217 A1 | 5/2006 | Lehane |
| 2006/0104306 A1 | 5/2006 | Adamczyk et al. |
| 2006/0112400 A1 | 5/2006 | Zhang et al. |
| 2006/0122835 A1 | 6/2006 | Huart et al. |
| 2006/0133286 A1 | 6/2006 | Elie-Dit-Cosaque et al. |
| 2006/0140136 A1 | 6/2006 | Filsfils et al. |
| 2006/0159029 A1 | 7/2006 | Samuels et al. |
| 2006/0179338 A1 | 8/2006 | Sumner |
| 2006/0215684 A1 | 9/2006 | Capone |
| 2006/0250967 A1 | 11/2006 | Miller et al. |
| 2006/0268742 A1 | 11/2006 | Chu et al. |
| 2006/0274760 A1 | 12/2006 | Loher |
| 2006/0280130 A1 | 12/2006 | Nomura et al. |
| 2006/0291385 A1 | 12/2006 | Yang |
| 2007/0041335 A1 | 2/2007 | Znamova et al. |
| 2007/0058571 A1 | 3/2007 | Rose |
| 2007/0064616 A1 | 3/2007 | Miranda |
| 2007/0107034 A1 | 5/2007 | Gotwals |
| 2007/0127395 A1 | 6/2007 | Jain et al. |
| 2007/0150480 A1 | 6/2007 | Hwang et al. |
| 2007/0153774 A1 | 7/2007 | Shay et al. |
| 2007/0171835 A1 | 7/2007 | Gobara et al. |
| 2007/0204017 A1 | 8/2007 | Maes |
| 2007/0212065 A1 | 9/2007 | Shin et al. |
| 2007/0223462 A1 | 9/2007 | Hite et al. |
| 2007/0258359 A1 | 11/2007 | Ogasawara et al. |
| 2007/0263554 A1 | 11/2007 | Finn |
| 2007/0286165 A1 | 12/2007 | Chu et al. |
| 2008/0019282 A1 | 1/2008 | Alaria et al. |
| 2008/0031149 A1 | 2/2008 | Hughes et al. |
| 2008/0031154 A1 | 2/2008 | Niazi et al. |
| 2008/0031283 A1* | 2/2008 | Curran-Gray et al. ........ 370/503 |
| 2009/0022069 A1 | 1/2009 | Khan et al. |
| 2009/0028044 A1 | 1/2009 | Windisch et al. |
| 2009/0059800 A1 | 3/2009 | Mohan |
| 2009/0080334 A1 | 3/2009 | DeCusatis et al. |
| 2009/0125595 A1 | 5/2009 | Maes |
| 2009/0144403 A1 | 6/2009 | Sajassi et al. |
| 2009/0175274 A1 | 7/2009 | Aggarwal et al. |
| 2009/0193057 A1 | 7/2009 | Maes |
| 2009/0201937 A1 | 8/2009 | Bragg et al. |
| 2009/0219823 A1 | 9/2009 | Qian et al. |
| 2009/0274153 A1 | 11/2009 | Kuo et al. |
| 2009/0296588 A1 | 12/2009 | Nishi et al. |
| 2009/0328051 A1 | 12/2009 | Maes |
| 2010/0049826 A1 | 2/2010 | Maes |
| 2010/0061254 A1 | 3/2010 | Thottakkara et al. |
| 2010/0061269 A1 | 3/2010 | Banerjee et al. |
| 2010/0069052 A1 | 3/2010 | Ahomaki et al. |
| 2010/0182937 A1 | 7/2010 | Bellagamba |
| 2010/0189118 A1 | 7/2010 | Nonaka |
| 2010/0226244 A1 | 9/2010 | Mizutani et al. |
| 2010/0293243 A1* | 11/2010 | Wittwer ........................ 709/208 |
| 2010/0302936 A1 | 12/2010 | Jan et al. |
| 2011/0019678 A1 | 1/2011 | Mehta et al. |
| 2011/0052206 A1* | 3/2011 | Zheng ................... H04J 3/0697 398/154 |
| 2011/0134804 A1 | 6/2011 | Maes |
| 2011/0305307 A1* | 12/2011 | Wang ................... H04J 3/0667 375/362 |
| 2012/0014377 A1* | 1/2012 | Joergensen et al. .......... 370/352 |
| 2012/0106339 A1 | 5/2012 | Mishra et al. |
| 2012/0113871 A1 | 5/2012 | Bulusu et al. |
| 2012/0224510 A1 | 9/2012 | Bulusu et al. |
| 2013/0086250 A1* | 4/2013 | Eskicioglu et al. ........... 709/224 |
| 2013/0215889 A1* | 8/2013 | Zheng et al. ................ 370/390 |
| 2013/0346987 A1* | 12/2013 | Raney et al. ................ 718/102 |
| 2015/0304066 A1* | 10/2015 | Dutti ................... H04L 43/0864 398/98 |

OTHER PUBLICATIONS

Jeong, J et al., "One-way Delay Measurement using IPv6 Source Routing," Feb. 2002, IETF, draft-jeong-1way-delay-ipv6-source-routing-00.txt, pp. 5-7.*

(56) References Cited

OTHER PUBLICATIONS

U.S. Appl. No. 13/077,828, filed Mar. 31, 2011 entitled "System and Method for Probing Multiple Paths in a Network Environment," Inventor(s): Hariharan Balasubramanian, et al.
USPTO Mar. 26, 2013 Non-Final Office Action from U.S. Appl. No. 13/077,828.
"Cisco Nexus 7000 F1 Series 32-Port 1 and 10 Gigabit Ethernet Module," Cisco Systems, Inc., San Jose, CA; Apr. 2013, 7 pages Cisco Nexus 7000 Series 32-Port 1 and 10 Gigabit Ethernet Module Data Sheet.
"Cisco Nexus 7000 Series Documentation Roadmap for NX-OS, Release 5.2," Cisco Systems, Inc., San Jose, CA; Aug. 16, 2011, 4 pages Cisco Nexus 7000 Series Documentation Roadmap for NX-OS, Release 5.2.
"Cisco Nexus 7000 Series NX-05 Troubleshooting Guide—Troubleshooting Tools and Methodology," © 1992-2012 Cisco Systems, Inc.; 26 pages http://docwiki.cisco.com/wiki/Cisco_Nexus_7000_Series_NX-OS_Troubleshooting_Guide_--_Troubleshooting_Tools_and_Methodology#Using_Pong.
"Cisco Nexus 7000 Series NX-OS Release Notes, Release 5.2," Cisco Systems, Inc., San Jose, CA, Sep. 19, 2012; 120 pages Cisco Nexus 7000 Series NX-OS Release Notes, Release 5.2.
"Cisco Nexus 7000 Series NX-OS System Management Configuration Guide, Release 5.x," Cisco Systems, Inc., San Jose, CA; Dec. 2011, 386 pages http://www.cisco.com/en/US/docs/switches/datacenter/sw/5_x/nx-os/system_management/configuration/guide/sm_nx-os.pdf.
"Cisco Nexus Software Release 5.2 for Cisco Nexus 7000 Series Switches," Product Bulletin, Cisco Systems, Inc., San Jose, CA, Jun. 2012, 7 pages.
Cisco White Paper, "Network Health Framework: A Proactive Approach," Cisco Systems, Inc., San Jose, CA; Feb. 2010, 8 pages http://www.cisco.com/en/US/services/ps6889/Cisco_NHFWhitePaper.pdf.
Eidson, John, "IEEE-1588 Standard for a Precision Clock Synchronization Protocol for Networked Measurement and Control Systems," Agilent Technologes, Inc., Nov. 10, 2005, 94 pages http://www.nist.gov/el/isd/ieee/upload/tutorial-basic.pdf.
Fedyk, D., et al., ISIS Extensions Supporting IEEE 802.1aq Shortest Path Bridging, Network Working Group Internet Draft, Mar. 8, 2011, 42 pages; http://tools.ietf.org/html/draft-ietf-isis-ieee-aq-05.
Hirschmann Automation and Control GmbH, White Paper, "Precision Clock Synchronization, the Standard IEEE 1588," Rev. 1.2, 20 pages; [retrieved and printed Mar. 19, 2013] http://www.belden.com/pdfs/Techpprs/Precision_Clock_Synchronization_WP.pdf.
IEEE Standards Department, "Virtual Bridged Local Area Networks—Amendment 6: Provider Backbone Bridges—IEEE P802.1ah/D4.2," © 2008, Institute of Electrical and Electronics Engineers, Inc., Mar. 26, 2008; 116 pages.
Kompella, K. and G. Swallow, "Detecting Multi-Protocol Label Switched (MPLS) Data Plane Failures," Network Working Group, RFC 4379, Feb. 2006, 52 pages; http://tools.ietf.org/pdf/rfc4379.pdf.
Malkin, G., "Traceroute Using an IP Option," Network Working Group, RFC 1393, Jan. 1993, 8 pages; http://tools.ietf.org/pdf/rfc1393.pdf.
PCT "International Preliminary Report on Patentability (dated Jan. 26, 2010; 1 page) and Written Opinion of the International Searching Authority and International Search Report (dated Oct. 2, 2008; 7 pages)," for PCT International Application PCT/US2008/070243.
PCT "International Preliminary Report on Patentability, Date of Issuance Jan. 20, 2009 (1 page), Written Opinion of the International Searching Authority, Date of Mailing Feb. 7, 2008 (6 pages) and International Search Report, Date of Mailing Feb. 7, 2008 (2 pages)," for PCT/US2007/015506.
Wikipedia, "IEEE 802.1ag," Connectivity Fault Management, retrieve and printed Nov. 2, 2010, 4 pages; http://en.wikipedia.org/wiki/IEEE_802.1ag.
Andreasan et al., "RTP No-Op Payload Format," Internet Draft, Internet Engineering Task Force, Feb. 2004, pp. 1-8.
Callon et al., "A Framework for Multiprotocol Label Switching," IETF Network Working Group, Internet Draft draft-ietf-mpls-framework-02.txt, Nov. 21, 1997.
Cheng, Jin et al., "Fast TCP: Motivation, Architecture, Algorithms, Performance," Aug. 2, 2004, 44 pages.
Deering, S., et al., "Internet Protocol Version 6," RFC 1883, Dec. 1995.
Feldman, N., "ARIS Specification," Internet Draft, Mar. 1997.
Kessler, G., "Chapter 2.2 PING of TCP: A Primer on Internet and TCP/IP Tools," RFC 1739; Dec. 1994; www.ietf.org.
McGovern, M., et al., "CATNIP: Common Architecture for the Internet," RFC 1707, Oct. 1994.
Nagami, K., et al., "Toshiba's Flow Attribute Notification Protocol (FANP) Specification," RFC 2129, Apr. 1997.
Newman, P. et al., "Ipsilon Flow Management Protocol Specification for IPv4 Version 1.0," RFC 1953, May 1996.
Newman, P. et al., "Ipsilon's General Switch Management Protocol Specification Version 1.1," RFC 1987, Aug. 1996.
Niccolini, S., et al. "How to store traceroute measurements and related metrics," Internet Draft draft-niccolini-ippm-storetraceroutes-02.txe., Oct. 24, 2005.
PCT Feb. 7, 2008 International Search Report for PCT/US2007/015506.
PCT Jan. 20, 2009 International Preliminary Report on Patentability and Written Opinion of the International Searching Authority for PCT/US2007/015506.
Perez, M., et al., "ATM Signaling Support for IP over ATM," RFC 1755, Feb. 1995.
Perlman, et al., "Rbridges: Base Protocol Specification," IETF Draft, Jan. 2009.
Perlman, Radia, "Rbridges: Transparent Routing," in Proc. IEEE INFOCOM, Mar. 2004.
Rosen et al., "A Proposed Architecture for MPLS," IETF Network Working Group, Internet Draft draft-ietf-mpls-arch-00.txt, Aug. 1997.
Rosen et al., "MPLS Label Stock Encoding," RFC 3032, Jan. 2001.
Rosenberg et al., "STUN—Simple Traversal of User Datagram Protocol (UDP) Through Network Address Translators (NATs)," Network Working Group, RFC 3489, Mar. 2003, 44 pgs.
Schulzrinne, H., et al., "RTP, A Transport Protocol for Real-Time Applications," Network Working Group RFC3550, Jul. 2003, 98 pages.
Smith, Bradley R., et al., "Securing the Border Gateway Routing Protocol," Global Telecommunications Conference, Nov. 18-22, 1996.
Touch, et al., Transparent Interconnection of Lots of Links (TRILL): Problem and Applicability Statement, RFC 5556, IETF, May 2009.
Townsley, et al., "Layer Two Tunneling Protocol, L2TP," Network Working Group, RFC 2661, Aug. 1999, 75 pages.
Ullman, R., "Rap: Internet Route Access Protocol," RFC 1476, Jun. 1993.
Viswanathan et al., "ARIS: Aggregate Route-Based IP Switching," Internet Draft, Mar. 1997.
Wang, Q. et al., "TCP-Friendly Congestion Control Schemes in the Internet," National Key Lab of Switching Technology and Telecommunication Networks, Beijing University of Posts & Telecommunications; 2001, pp. 211-216; http://www.sics.se/~runtong/11.pdf.
Woundy et al., "ARIS: Aggregate Route-Based IP Switching," Internet Draft draft-woundy-aris-ipswitching-00-txt, Nov. 1996.
Gobrial, Margret N., "Evaluation of Border Gateway Protocol (BGP) Version 4(V4) in the Tactical Environment," Military Communications Conference, Oct. 21-24, 1996; Abstract Only http://ieeexplore.ieee.org/xpl/login.jsp?tp=&arnumber=569372&url=http%3A%2F%2Fieeexplore.ieee.org%2Fie13%2F4198%2F12335%2F00569372.pdf%3Farnumber%3D569372.
Halabi, Bassam, *Internet Routing Architectures* (CISCO), Macmillan Technical Publishing, Apr. 23, 1997; Abstract and Table of Contents only. http://www.ciscopress.com/store/internet-routing-architectures-cisco-9781562056520.
Handley and V. Jacobson, "SDP: Session Description Protocol," RFC 2327; Apr. 1998, 43pgs.

(56) References Cited

OTHER PUBLICATIONS

Heinanen, J., "Multiprotocol Encapsulation over ATM Adaptation Layer 5," RFC 1483, Jul. 1993.

IEEE Standards Department, "Virtual Bridged Local Area Networks—Amendment 9: Shortest Path Bridging—IEEE P802.1aq/D2.1," © 2009, Institute of Electrical and Electronics Engineers, Inc., Aug. 21, 2009; 208 pages.

Jennings, C., "NAT Classification Test Results," Internet Draft draft-jennings-behave-test-results-02draft-jennings-behave-test-results-02.txt, Jun. 25, 2006.

Katsube, Y. et al., "Toshiba's Router Architecture Extensions for ATM: Overview," RFC 2098, Feb. 1997.

Laubach, M., "Classical IP and ARP over ATM," RFC 1577, Jan. 1994.

Laubach, M., "IP over ATM Working Group's Recommendations for the ATM Forum's Multiprotocol BOF Version 1," RFC 1754, Jan. 1995.

Liao et al., "Adaptive Recovery Techniques for Real-time Audio Streams," IEEE INFOCOM2001; Twentieth Annual Joint Conference of the IEE Computer and Communications Societies Proceedings, Apr. 22-26, 2001, vol. 2, pp. 815-823.

\* cited by examiner

US 9,450,846 B1

SYSTEM AND METHOD FOR TRACKING PACKETS IN A NETWORK ENVIRONMENT

TECHNICAL FIELD

This specification relates in general to the field of communications, and more particularly, to a system and method for tracking packets in a network environment.

BACKGROUND

Service providers can deliver a rich set of business and consumer services over increasingly large and complex networks, but these networks should be reliable and performing optimally, as any degradation in the health of the network directly affects all their services, potentially creating subscriber churn and loss of revenue due to poor end user experience. The health of the network can also directly affect operating costs, since business applications depend on the network. Thus, the health of the network ranks as a vital priority for network operators. Growth and change can pose a significant challenge to network operators and service providers, particularly when changes in equipment, configurations, or applications can affect the overall health of a network. As network architectures continue to evolve and networks continue to expand, monitoring the health of networks also continues to become an increasingly complex task.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment that includes transmitting a message from a first port to a second port, recording a timestamp of the message at each clock between the first port and the second port, and transmitting a first follow-up message from a first port to a second port to collect timestamps (e.g., of the message) at each clock between the first port and the second port. The method further includes transmitting a loopback message from the second port to the first port, recording timestamps of the loopback message at each clock between the second port and the first port, and transmitting a second follow-up message from the second port to the first port to collect and append the timestamps of the loopback message at each clock.

In some embodiments, the message may be a probe message, while in other embodiments, the message may be general message traffic. In particular embodiments, the message is a probe message injected at an interface of a network element. In other particular embodiments, the interface of the network element includes one or more of an ingress port of a switch, an ingress port of a router, and an egress port of a network interface card. In yet more particular embodiments, the message may be terminated and regenerated at each clock. In still yet more particular embodiments, the follow-up messages may be precision time protocol messages (e.g., IEEE 1588 messages), which may include a sequence identifier, a time stamp header, and time stamp records. In some embodiments, the recording of the timestamp of the message is performed in-line with the transmitting of the message.

Example Embodiments

Figure 1:
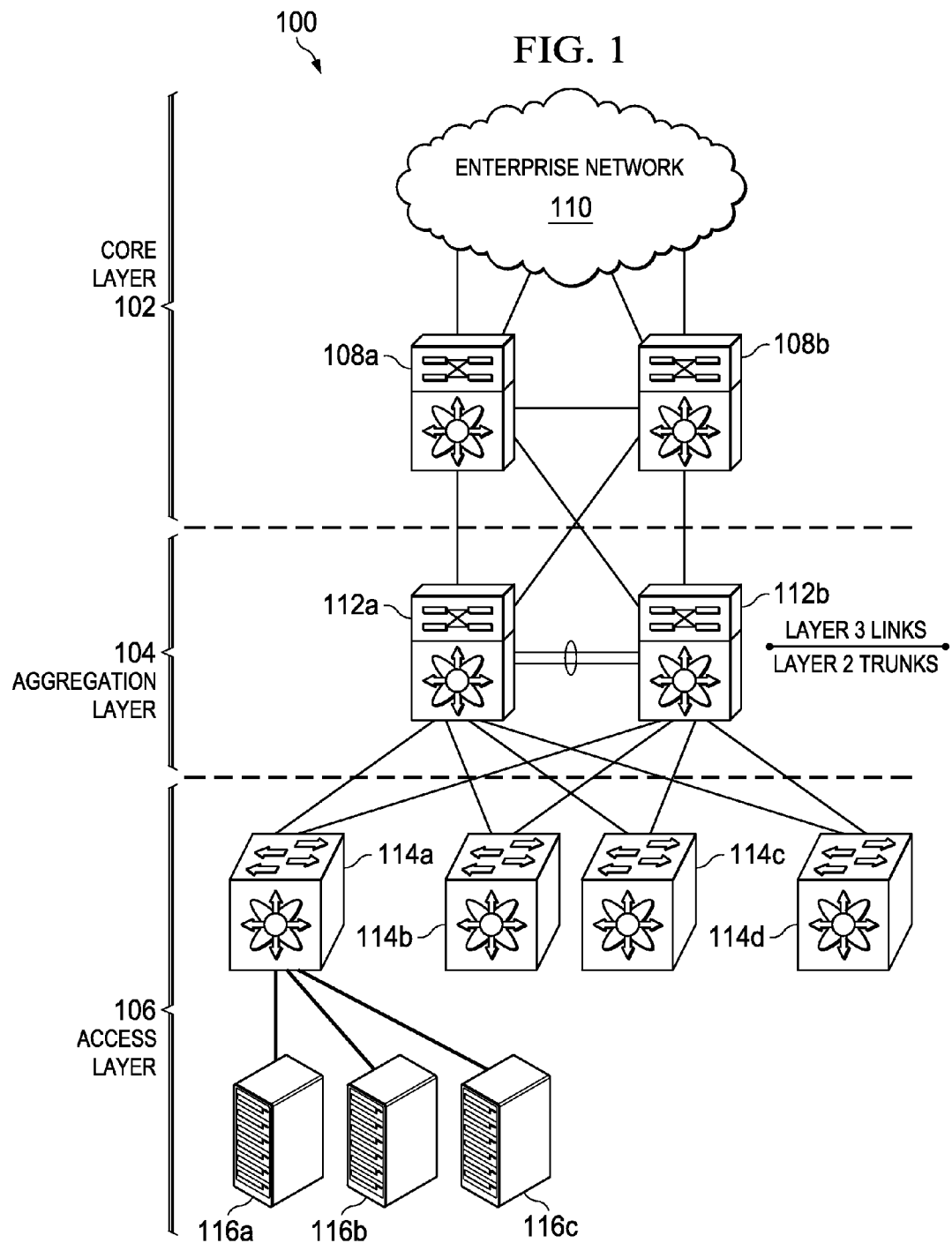
FIG. 1 is a simplified block diagram illustrating an example embodiment of a network environment in which packets may be tracked according to this specification.

Turning to FIG. 1, FIG. 1 is a simplified block diagram of an example embodiment of a network environment 100 in which packets may be tracked. Network environment 100 in this example is illustrative of a hierarchical datacenter network topology, which includes a core layer 102, an aggregation layer 104, and an access layer 106. Core layer 102 generally represents the backbone of the network and may include high-end switches (e.g., switches 108a-108b) and high-speed cables such as fiber cables. Core layer 102 is generally responsible for fast and reliable transportation of data across an enterprise network 110. Aggregation layer 104 typically includes routers and layer 3 switches (e.g., switches 112a-112b) to ensure that packets are properly routed. Access layer 106 may include hubs and switches (e.g., switches 114a-114d) and may connect to nodes, such as servers 116a-116c, to the network. FIG. 1 also illustrates a boundary between Layer-3 routed networking and Layer-2 Ethernet broadcast domains at aggregation layer 104. Larger Layer-2 domains can increase the physical flexibility of the data center—providing the capability to manually or virtually relocate a server to a different physical rack location with less chance of requiring a change of IP addressing to map to a specific subnet.

Network environment 100 may use redundant switches at each layer of the network topology for device-level failover that creates a highly available transport between end nodes using the network. Data center networks often require additional services beyond basic packet forwarding, such as server load balancing, firewall, or intrusion prevention. These services might be introduced as modules populating a slot of one of the switching nodes in the network, or as standalone appliance devices. Each of these service approaches also supports the deployment of redundant hardware to preserve the high availability standards set by the network topology.

Each of the elements of FIG. 1 may couple to one another through simple interfaces or through any other suitable connection, which provides a viable pathway for network communications. Additionally, any one or more of these elements may be combined or removed from the architecture based on particular configuration needs. Network environment 100 may include a configuration capable of Ethernet communications, and may also operation in conjunction with transmission control protocol/Internet protocol (TCP/IP) communications for the transmission or reception of packets in a network flow. Network environment 100 may also operate in conjunction with a user datagram protocol/IP (UDP/IP) or any other suitable protocol where appropriate and based on particular needs. Input/output (I/O) may be consolidated in network environment 100 so that the same physical infrastructure can carry different types of traffic, which typically have very different traffic characteristics and transmission requirements.

For purposes of illustrating certain example embodiments of network environment 100, some contextual information is provided below to offer an overview of some challenges of managing network resources. Such information is offered earnestly and for teaching purposes only and, therefore, should not be construed in any way to limit the broad applications of the present disclosure.

Various network-monitoring tools exist to assist in diagnosing and analyzing the health of networks. Internet Control Message Protocol (ICMP) ping and traceroute are two such network diagnostics tools that can assist with detecting network connectivity issues, and each can generate various network measurement metrics. There are some notable distinctions between ping and traceroute, though. The ping utility generates a series of echo packets to a destination across an internetwork. When the echo packets arrive at the destination, they are rerouted and sent back to the source. The ping utility operates at the network layer (i.e., layer 3) and can be used to verify connectivity and latency to a particular destination across a network, for example. The traceroute utility operates in a similar fashion but identifies the path taken on a hop-by-hop basis and includes a time stamp at each hop in both directions. Traceroute can be used to test the connectivity of ports along the path between the generating device and the device closest to the destination, for example. It can also be used to calculate the inter-switch (hop-to-hop) latency. Thus, ping and traceroute can be used to troubleshoot problems with connectivity and path choices, but are not generally ideal for identifying or resolving network performance issues, such as complaints about application responsiveness.

One difficulty with diagnosing network performance issues is that the underlying problem may lie with a client, the data network, the server, the storage area network, the storage array, or any combination of the above. Latency is one metric that can be affected by a very large array of real problems in the network, including congestion, route flaps, and non-optimal forwarding topologies, for example. Sampled latency information can also give information on whether a service provider is meeting service level agreements for both latency and frame delivery.

In accordance with embodiments disclosed herein, network environment 100 provides a system and method for measuring packet arrival and departure times and packet deliveries across paths in a network. Tracking packets over time in a network can be advantageous for understanding network performance over time, and for identifying and resolving network performance issues.

In particular embodiments, source, destination, and measurement points can be deployed in any network elements, such as a bridge, router, end host, a network port and/or internal nodes in any network. End-to-end latency can be measured through particular paths over time. This information may be monitored on a single request basis and/or collected through management information base (MIB) statistics to determine a histogram of latencies over time for both unicast and multi-destination traffic.

In some embodiments, collection devices may have alarm triggers when measurement characteristics violate required profiles. Collection devices may also log these statistics in raw form or log compressed statistical information over time. Sessions may be long-lived or rotating across various paths to measure critical areas of a network, depending on traffic patterns such as time-of-day variability, for example. Rotating paths can spread loads for supporting many simultaneous sessions (such as for monitoring multipath environments) and for coverage (as opposed to fixed periodic measurements).

Various statistics may be recorded within the MIB, including maximum, minimum, average, variance, and jitter/ranges over time and measured over various portions of the network not restricted to wiring (link delay), intra-network port to network port, internal system delays, or any arbitrary switch port to another switch port in forward and/or reverse directions, for example. Network ports can include switch, router, and/or server ports, among others. Triggers for alarms and actions can be equally granular. Multiple unidirectional or bidirectional sessions can be concurrently active. Multicast sessions can also provide data for multicast health monitoring. Information across multiple paths and varying quality of service (QoS)/virtual lanes (VL) can also be analyzed concurrently for statistic analysis purposes and for triggers for re-provisioning. Latency measurements that are link-to-link directly relate to distance and can quantify precise buffer and bandwidth requirements.

Returning to FIG. 1, elements in network environment 100, including switches 108a-108b, switches 112a-112b, switches 114a-114d, servers 116a-116c, and others, are representative of any suitable network element or node, which is meant to encompass network appliances, servers, routers, switches, gateways, bridges, load balancers, modules, or any other device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with elements of network environment 100, each of switches 108a-108b, switches 112a-112b, switches 114a-114d, servers 116a-c, and others can include memory elements for storing information to be used in the operations outlined herein.

Moreover, each element may include one or more interfaces, and such interfaces may also include appropriate memory elements. Each of switches 108a-108b, switches 112a-112b, switches 114a-114d, servers 116a-116c, and others may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein should be construed as being encompassed within the broad term "memory element" or "memory." Information being used, tracked, sent, or received by switches 108a-108b, switches 112a-112b, switches 114a-114d, servers 116a-116c, and others could be provided in any database, register, queue, table, cache, control list, or other storage structure, all of which can be referenced at any suitable timeframe. Any such storage options may be included within the broad term "memory element" or "memory" as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one example implementation, switches 108a-108b, switches 112a-112b, switches 114a-114d, servers 116a-116c, and others may include software modules to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of switches 108a-108b, switches 112a-112b, switches 114a-114d, servers 116a-116d, and others may include one or more processors (or virtual processors) that can execute software or an algorithm to perform activities as discussed herein. A processor, virtual processor, logic unit, or other processing unit can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

Figure 2:
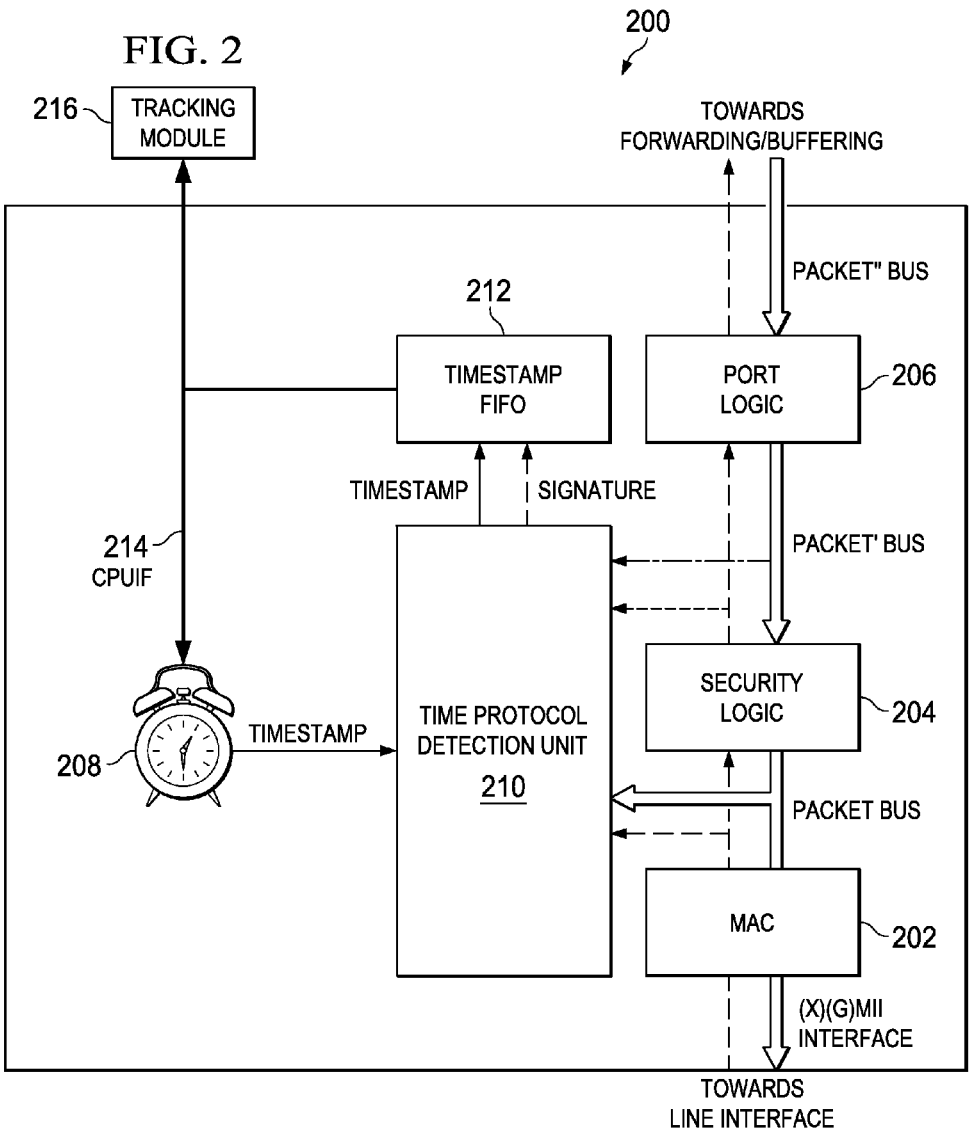
FIG. 2 is a simplified logical block diagram illustrating additional details of a network interface logic that may be associated with certain network elements in example embodiments of the network environment.

Turning to FIG. 2, FIG. 2 is a simplified logical block diagram illustrating additional details of a network interface logic 200 that may be associated with certain network elements in example embodiments of network environment 100. Network interface logic (NIL) 200 may, for example, be implemented within an ASIC, FPGA or processor on a line card, adapter card or network interface card in any or all of switches 108a-108b, switches 112a-112b, switches 114a-114d, or servers 116a-116c. In the example embodiment illustrated in FIG. 2, NIL 200 includes a media access controller (MAC) 202, security logic 204, and port logic 206. NIL 200 also includes a clock 208, a time protocol detection unit 210, and a timestamp unit 212. A central processing unit (CPU) interface 214 allows communication with other software and/or hardware, such as tracking module 216. NIL 200 may further include or communicate with additional hardware and/or software elements to facilitate operations described herein, and can also be configured to store, aggregate, process, export, and/or otherwise maintain data in any appropriate format, where these activities can involve MAC 202, security logic 204, port logic 206, clock 208, time protocol detection unit 210, timestamp unit 212, CPU interface 214, and/or tracking module 216, for example.

NIL 200 may provide many capabilities to network environment 100, such as frame injection, front panel traffic buffering to avoid frame drop, round-trip time measurement (e.g., via reinjection in reverse direction), per port or shared timestamp and signature FIFOs (i.e., first-in-first-out), shared or dedicated ingress and egress with configurable head or tail drop, frame identification, frame redirection (and optional copy based on packet fields), and frame deletion at network egress (may be a negotiated egress or other port such as a host port, and may be identified granularly based on destination address, an arbitrary frame field, or combination of fields and port information, for example). Probe frames may also be excluded from statistics, notably for injection and deletion (separate accounting).

Probe packets may be injected with minimal perturbation to network environment 100 from any port or set of ports, and generic frames may be inserted with explicit signatures. Frame size and rate may be programmable with rate-programmable sharable with other frames, such as diagnostic frames. Frames may be injected without redirection to avoid looping, and FIFOs may be shared or dedicated across ports.

Frames may be identified for correlation purposes, for example, or selected for timestamping and sampling purposes. Selection may be based on any field or set of fields, including logical operations thereof, providing different granularity (e.g., link/port) and flexibility for path selection (e.g., multi-pathing/vpc/port channel).

Clock 208 is generally derived from a system-local crystal oscillator manufactured to a specific frequency tolerance and specific frequency stability. Deviation is typically specified in units of Parts per Million (PPM) and a typical value is ±100 PPM, which is equivalent to ±0.01% variability.

Before clocks can be used, they should first be initialized to match a local or global reference. This action is referred to as "offset synchronization." Because two different clocks generally depend on different crystals running at different frequencies, two system clocks will drift with respect to each other. If one clock contains a frequency synthesizer that is tunable (i.e., to some required precision) and the rate mismatch is known, then that clock (Slave Clock) can be rate adjusted to match the other clock (Master Clock). This action is referred to as rate synchronization or syntonization.

Although only a single clock 208 is illustrated in FIG. 2, additional clocks may be implemented. In general, the number of local clocks may be determined by the number of sub-domains supported. Software can support multiple sub-domains within an ASIC through virtual clocks, for example. Each virtual clock may maintain its own absolute offset, the last calibrated offset time (in hardware time) and relative rate difference. Each virtual clock time can be computed with respect to the hardware clock on a use-basis, and each virtual clock is both offset and rate adjusted together with or without adjustments to the hardware clock. Sharing clocks can be explicit in hardware through sharing of certain subset or all bits of the clock driver output, or may be implicit through CPU control. In general, any clock can sync to any other clock within a chassis.

In some embodiments, applications may share a single clock with the highest precision requirement within an ASIC. An application may determine timestamp width in bits. There are no hard requirements or restrictions on the number of applications, as long as the appropriate precision and accuracy is achievable. One idealized example is for any ASIC with a timer to place the width clock on-chip and select the relevant range of bits according to the application requirements.

In other embodiments, applications may share clocks with completely different precision requirements (beyond range based) and/or different time bases. Each clock can be either virtual or hardware based and each clock would be synchronized to its master clock in the system.

In more particular embodiments, NIL 200 may implement a precision time protocol (PTP) for synchronizing clocks throughout network environment 100. In general terms, a PTP is a distributed protocol that specifies how real-time clocks in a network environment can synchronize with each other. The clocks may be organized into a master-slave synchronization hierarchy with a grandmaster clock, the clock at the top of the hierarchy, determining the reference time for the entire system. Synchronization may be achieved by exchanging PTP timing messages, with the slave members using the timing information to adjust their clocks to the time of their master in the hierarchy. PTP operates within a logical scope called a PTP domain. Thus, time protocol detection unit 210 may detect PTP packets and timestamp unit 212 may store PTP timestamps.

In some embodiments, for example, NIL 200 may implement a PTP as defined by the Institute of Electrical and Electronics Engineers (IEEE) in the 1588 standards. IEEE 1588 defines mechanisms for both rate and offset synchronization. The IEEE 1588 standards describe a hierarchical master-slave architecture for clock distribution. Under this architecture, a time distribution system consists of one or more communication media (network segments), and one or more clocks. An "ordinary" clock is a device with a single network connection and is either the source of (master) or destination for (slave) a synchronization reference. A "boundary" clock has multiple network connections and can accurately bridge synchronization from one network segment to another. A synchronization master is elected for each of the network segments in the system. The root timing reference is called the grandmaster. The grandmaster transmits synchronization information to the clocks residing on its network segment. The boundary clocks with a presence on that segment can then relay accurate time to the other segments to which they are also connected. A simplified PTP system frequently consists of ordinary clocks connected to a single network. No boundary clocks are used. A grandmaster is elected and all other clocks synchronize directly to it.

IEEE 1588-2008 also introduces a "transparent" clock associated with network equipment used to convey PTP messages. A transparent clock modifies PTP messages as they pass through the device. Timestamps in the messages are corrected for time spent traversing the network equipment. For example, a transparent clock can account for residence time, or it may incorporate both residence time and path latency in a correction field. This scheme can improve distribution accuracy by compensating for delivery variability across the network.

A PTP system can consist of a combination of PTP and non-PTP devices. PTP devices include ordinary clocks, boundary clocks, and transparent clocks. Non-PTP devices include ordinary network switches, routers, and other infrastructure devices.

In general terms, a PTP process consists of two phases: (1) establishing the master-slave hierarchy and (2) synchronizing the clocks. To establish a hierarchy within a PTP domain, each port of an ordinary or boundary clock can examine the contents of received announce messages (issued by ports in the master state) and compares the data sets of the foreign master (in the announce message) and the local clock for priority, clock class, accuracy, etc. Based on this comparison, each port can determine its own state as either master or slave. After the master-slave hierarchy has been established, the clocks can be synchronized. For example, the master can send a synchronization message to the slave and note the time it was sent. The slave receives the synchronization message and notes the time it was received. The slave can then send a delay-request message to the master and note the time it was sent. The master receives the delay-request message and notes the time it was received. The master sends a delay-response message to the slave. The slave uses these timestamps to adjust its clock to the time of its master.

Synchronization and management of a PTP system is generally achieved through the exchange of messages across the communications medium. These messages can be generally classified as either "event" messages or "general" messages. In some embodiments, such as IEEE 1588, messages can be either Layer 2 or Layer 3 messages. Cryptographic authentication (e.g., IEEE MAC Security standard, IP Security) can be made available through 1588v2 or other extensions, for example, which may be provided in security logic 204 in some embodiments.

Event messages are time-stamped and time-critical in that accuracy in transmission and receipt timestamp accuracy directly affects clock distribution accuracy. MAC hardware recognizes these probe packets on arrival and departure for time-stamping purposes. These messages can be time-stamped in-band or out-of-band. Event messages in IEEE 1588 are sent using UDP Destination Port 319 and can include Sync, Delay_Req, Pdelay_Req and Pdelay_resp.

General messages are not usually time-stamped. These message types are also more conventional protocol data units to the extent that the data in these messages is of importance to PTP, but their transmission and receipt timestamps are not. For example, general messages may include management messages and other un-timed messages carrying sampled timestamps of corresponding event messages. General messages in IEEE 1588 are sent using UDP Destination Port 320 and can include Announce, Follow_Up, Delay_Resp, Pdelay_Resp_Follow_Up, Management and Signaling messages.

Sync, Delay_Req, Follow_Up, and Delay_Resp messages are used by ordinary and boundary clocks and can communicate time-related information used to synchronize clocks across the network. Sync messages reflect delay in the master-to-slave path. Delay_Req reflects delay in the slave-to-master path. Pdelay_Req, Pdelay_Resp, and Pdelay_Resp_Follow_Up can be used by transparent clocks to measure delays across the communications medium so that they can be compensated for by the system. Announce messages can be used by a best master clock algorithm to build a clock hierarchy and select the grandmaster. Management messages can be used by network management to monitor, configure, and maintain a PTP system. Signaling messages can be used for non-time-critical communications between clocks. With the exception of management messages, PTP messages in IEEE 1588 are generally sent using multicast messaging. Management messages may be sent using unicast.

NIL 200 may also implement another type of follow-up message, referred to herein as a DFollow_Up message, to collect hop-by-hop absolute timestamps. This follow-up message type may be a negotiated message that provides a combination of control and flags to determine behavior. For example, control can indicate the message type, and flags can indicate hop-by-hop timestamp insertion or endpoint timestamp insertion. Another type of sync message, referred to herein as a Dsync message, may also be implemented for initiating time stamping for forward and reverse path collection.

Figure 3:
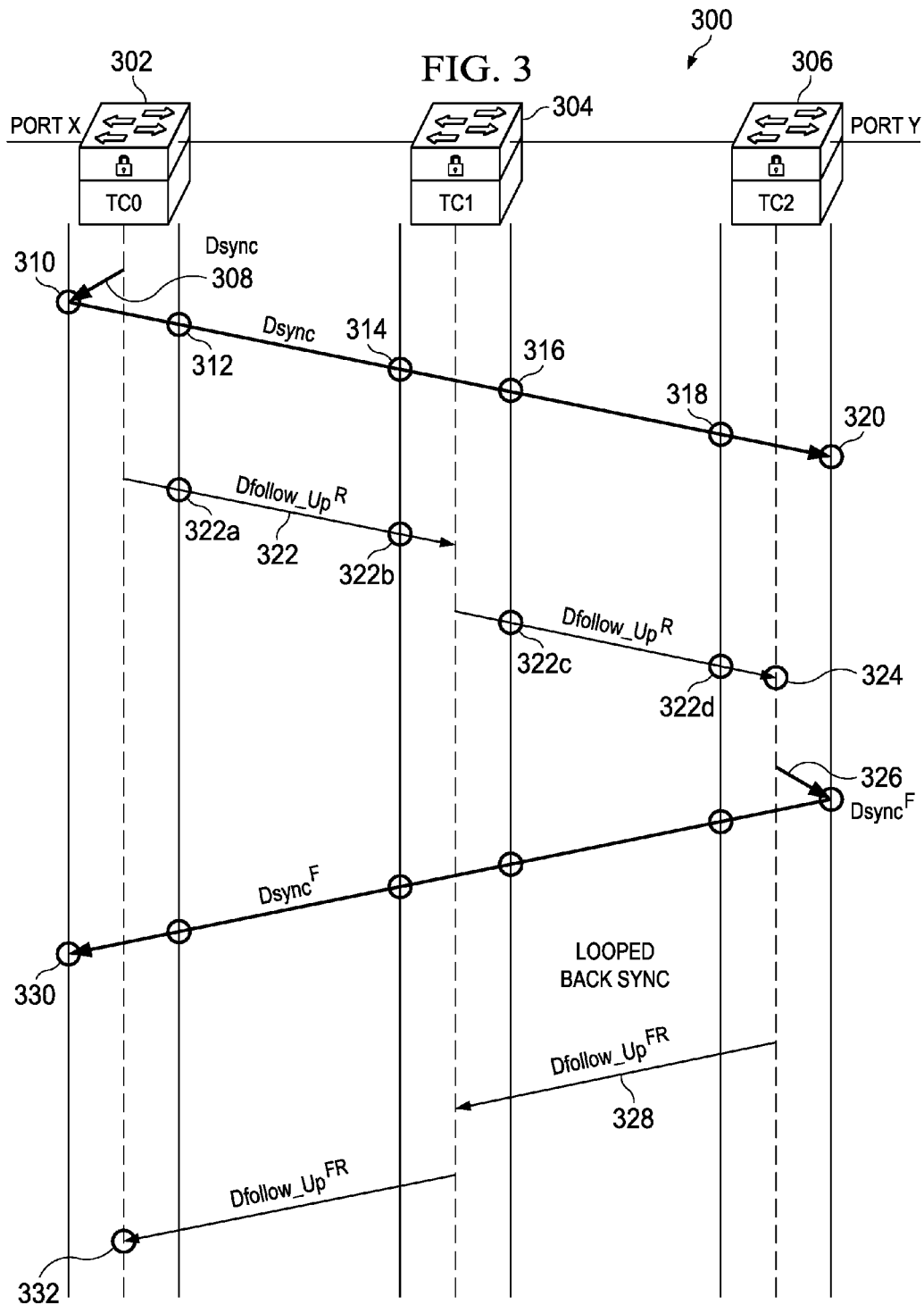
FIG. 3 is a simplified interaction diagram illustrating potential operations that may be associated with measuring latency between two ports in example embodiments of the network environment.

FIG. 3 is a simplified interaction diagram 300 illustrating potential operations that may be associated with measuring latency between two ports in example embodiments of network environment 100. FIG. 3 includes network elements 302-306. Network element 302 includes a port X, and network element 306 includes a port Y. Network elements 302-306 include clocks TC0-TC2, respectively, which in this example are transparent clocks in an IEEE 1588 PTP domain. The general objective of the operations in the example of FIG. 3 is to measure latency between port X and port Y.

TC0 can initiate a unicast message 308 from a MAC (not shown) at port X, and at 310 can record the timestamp at port X. Message 308 may be a probe, such as a Dsync message, in some implementations, but it may also be general application traffic, such as certain voice or Network Time Protocol (NTP) packets. The MAC forwards message 308, and the egress timestamp at TC0 becomes available at 312 when message 308 leaves TC0. Message 308 may be time-stamped upon entering TC1 at 314, and again at 316 as it exits TC1. Message 308 may be time-stamped at 318 upon entering TC2. Message 308 may reach a TC2 MAC (not shown) at port Y and the egress time-stamp can be recorded at 320. Message 308 may be deleted by the egress MAC. A follow-up message 322 (e.g., a DFollow_Up) can collect and append all ingress and egress timestamps at 322a-322d. At 324, follow-up message 322 may terminate at TC2, and a loopback message 326 (e.g., a Dsync) can be initiated in the reverse loopback direction. Another follow-up message 328 (e.g., a Dfollow_Up) can also be created in the loopback direction. Loopback message 326 can be terminated at 330 (TC0 port X). Physical layer/MAC latency adjustments can be incorporated at each timestamp measurement point.

Figure 4:
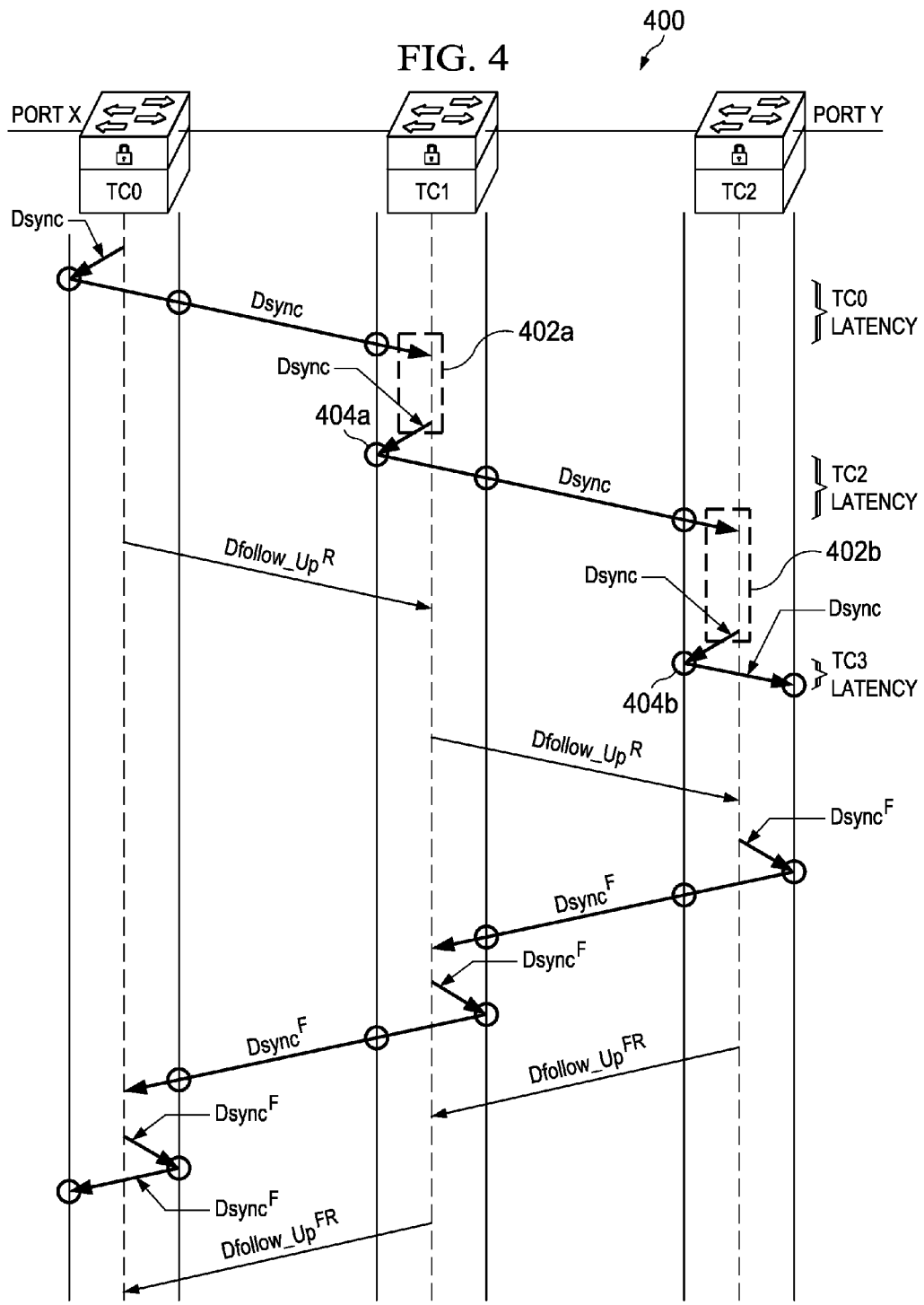
FIG. 4 is a simplified interaction diagram that illustrates other potential operations that may be associated with measuring latency between two ports in example embodiments of the network environment.

FIG. 4 is a simplified interaction diagram 400 that illustrates other potential operations that may be associated with measuring latency between two ports in example embodiments of network environment 100. The operations illustrated in FIG. 4 are similar to the example operations of FIG. 3, but a delayed-sync mode of operation can terminate and regenerate sync frames at 402a-402b. Additional ingress timestamps may be collected at 404a-404b to assemble total latency (i.e., TC0+TC1+TC2 latencies). Such operations may be advantageous, as later-stage transparent clocks do not experience an accumulation of sync data. Delayed-sync mode may also be enabled in part of the network. For example, when enabled on switches egressing to host facing ports, software on that switch can run-time selectively enable Dsync packet deletion when receiving packets destined for designated host facing ports.

Figure 5:
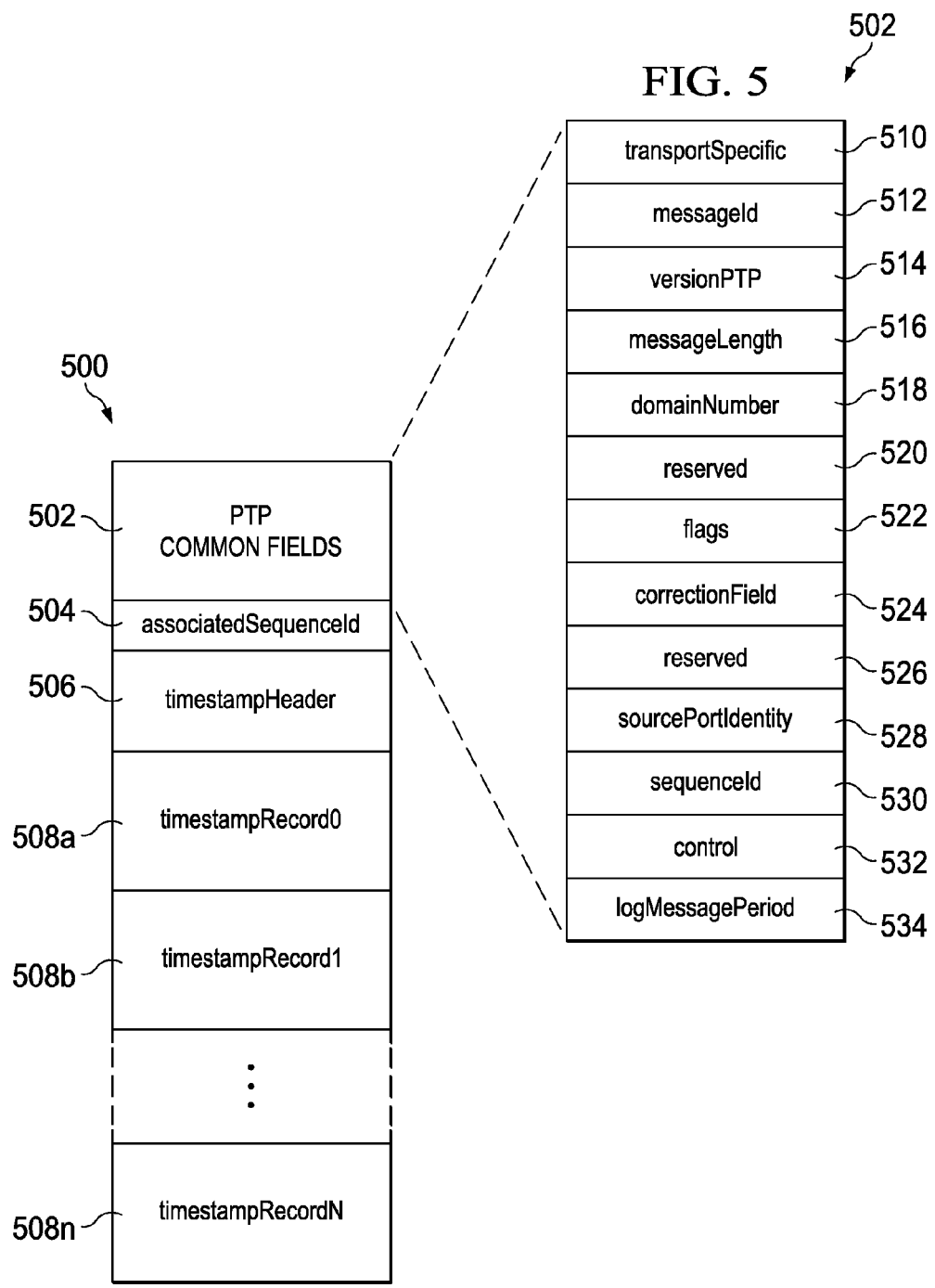
FIG. 5 is a simplified schematic of an example embodiment of a message format that may be associated with some operations in the network environment.

FIG. 5 is a simplified schematic 500 of an example embodiment of a message format that may be associated with some operations in network environment 100. Such a format may be associated with a Dfollow_up message, for example. Each message may include common fields 502, an associated sequence identifier (associatedSequenceID) 504, a time stamp header 506, and time stamp records (timestampRecord0-timestampRecordN) 508a-508n (collectively 508). Sequence identifier 504 may be used to identify a corresponding sync message, such as a Dsync message. Other fields are described in more detail below.

Common fields 502 are representative of fields that may be common among all message types in a time protocol, such as PTP. In FIG. 5, common fields (PTP Common Fields) 502 are illustrative of common fields in a IEEE 1588 implementation, which include a transport-specific (transportSpecific) field 510, a message identifier (messageID) 512, a version (versionPTP) field 514, a message length (messageLength) 516, a domain number (domainNumber) 518, a reserved field 520, flags 522, a correction (correctionField) field 524, another reserved field 526, a source port identifier (sourcePortIdentity) 528, a sequence identifier (sequenceID) 530, a control field 532, and a log message period (logMessagePeriod) 534.

In general terms, transport-specific field 510 may include transport-layer specific information, such as frame padding and/or time-stamping requirements. Message identifier 512 can identify the type of messages. For example, IEEE 1588 identifies message types with an integer value, where a Sync message is identified with a 0, a Delay_Req message with a 1, etc. A Dfollow_up message may also be identified with such a unique integer value, but message types may be identified with other types of data (e.g., string values). Version field 514 may be used to distinguish protocol versions. Message length 516 provides the total length of message, commonly specified in octets starting from the first octet of common fields 502. Domain number 518 corresponds to the domain number of the originating ordinary or boundary clock, or primary domain of the PTP clock. Flags 522 can be used to control certain options, behaviors, and operations, such as security and multicasting, for example. Correction field 524 may contain the accumulated residence time. Source port identifier 526 may identify the originating port of the message. Sequence identifier 530 corresponds to an identifier that may be assigned by an originating clock. Control field 532 is similar to message identifier 512, but with fewer options. In IEEE 1588 implementations, control field 532 is generally maintained for backward compatibility with prior versions. Log message period 534 specifies an interval for logging, and is generally dependent upon the type of message.

Figure 6:
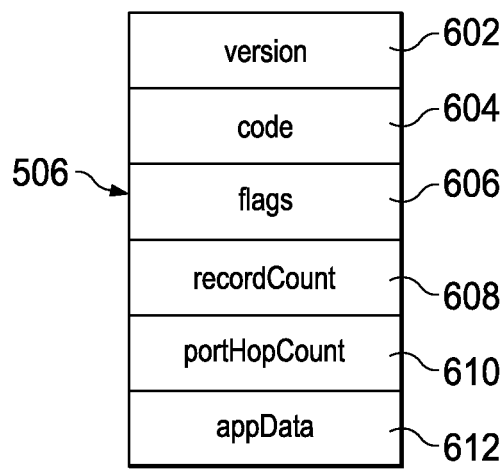
FIG. 6 is a simplified schematic diagram illustrating additional details that may be associated with example implementations of a timestamp header in some embodiments of the network environment.

FIG. 6 is a simplified schematic diagram 600 illustrating additional details that may be associated with example implementations of timestamp header 506 in some embodiments of network environment 100. In this example, timestamp header 506 provides a version 602 indicative of the time stamp version. It also includes an insertion code 604 indicative of the timestamp insertion mode, such as hop-by-hop timestamp insertion or endpoint timestamp insertion. Flags 606 are indicative of bookkeeping attributes such as direction (forward or loopback), fullness (when supported) because the packet MTU is reached and no more records can be added, timestamping-capable-neighbor (as not every hop is required to be timestamping capable). A record count (recordCount) 608 is indicative of the number of timestamp records that follow timestamp header 506 in a message. A decrementing port hop count field 610 may provide the number of hops left before loopback. An application data field 612 may include arbitrary application data.

Figure 7:
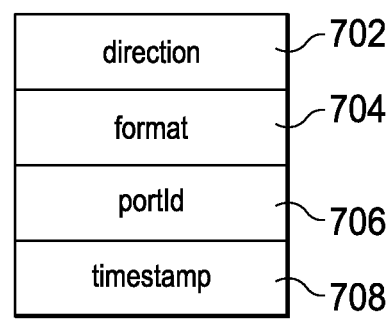
FIG. 7 is a simplified schematic diagram illustrating additional details that may be associated with example implementations of timestamp records in some embodiments of the network environment.

FIG. 7 is a simplified schematic diagram 700 illustrating additional details that may be associated with example implementations of timestamp records 508 in some embodiments of network environment 100. In this example, a timestamp record provides a direction field 702 that indicates forward or loopback direction. A format field 704 may indicate the format associated with a port identifier (portID) 706. Port identifier 706 may provide various combinations of Layer 3, Layer 2, and port index addressing in various combinations, as well as IEEE 1588 port identifiers. For example, a default value of zero in format field 704 may indicate the port identifier 706 includes an 80 octet portIdentity as defined by IEEE 1588 for that port. A timestamp 708 corresponds to a timestamp of an event associated with the message.

Messages may be identified in several ways. For example, Layer 2 frames may be distinguished by Ethertype. In some embodiments, event messages and general messages may be identified with distinct Ethertype values. In other embodiments, event messages and general messages may share an Ethertype and distinguished with a message identifier field, such as message identifier 512. Frame redirection through index direct (e.g., static match) or programmable offset access control lists (ACLs) may also be used to identify messages. Layer 3 packets may be identified by port numbers in some embodiments. For example, in IEEE 1588 implementations, UDP port 319 may be used exclusively for event messages and UDP port 320 may be used for general messages. Frame redirection through index direct (e.g., static match) or ACLs may also be used. Port identifiers can come from (LID) or an IEEE 1588 port identifier. A message identifier field can be parsed to capturing Follow_Up frames. Slow-path rewrite of frames is available through Delayed_Sync mode of operation.

Figure 8A:
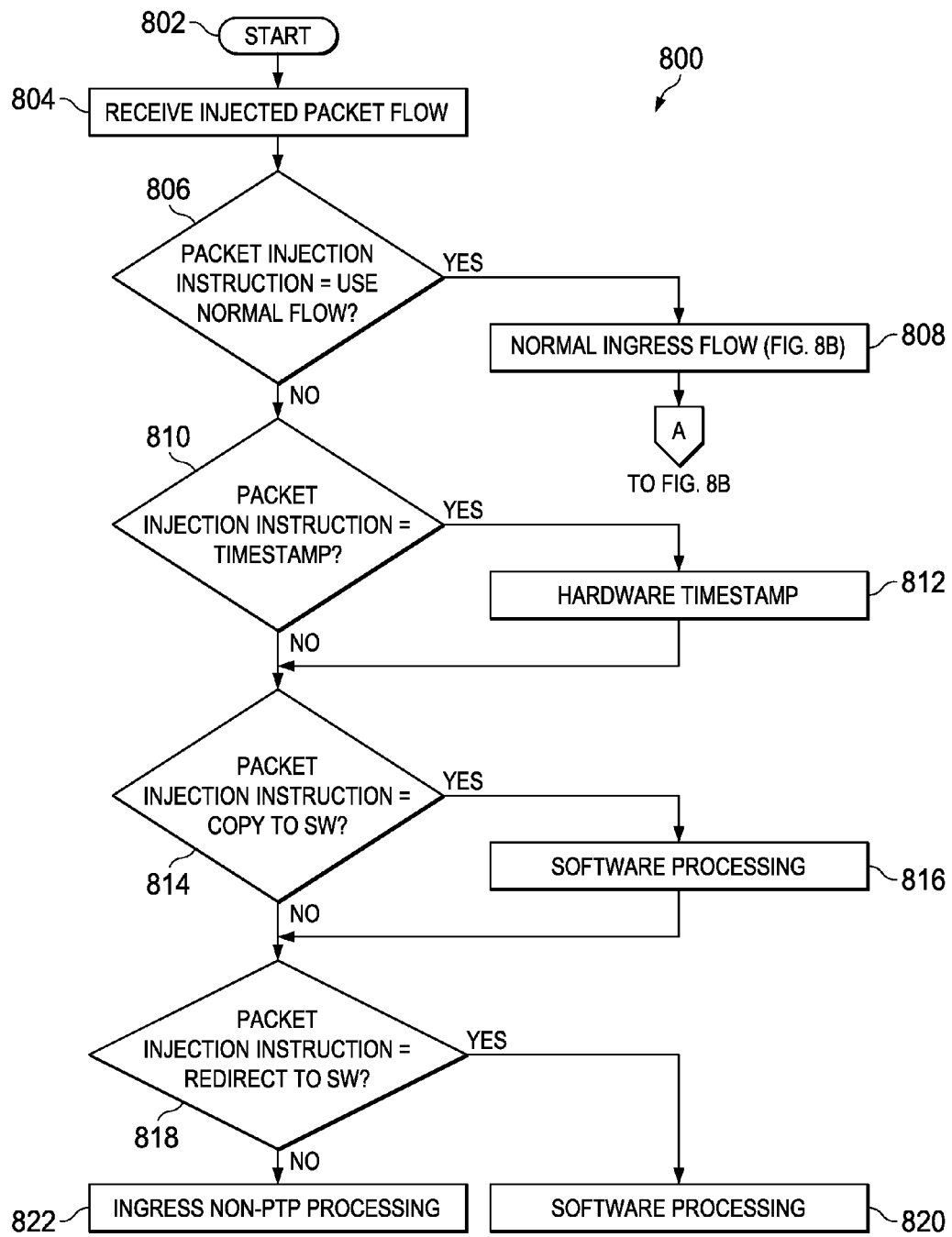
FIGS. 8A-8B are a simplified flowchart illustrating potential operations that may be associated with packets ingressing network interface logic (NIL) in example embodiments of the network environment.
Figure 8B:
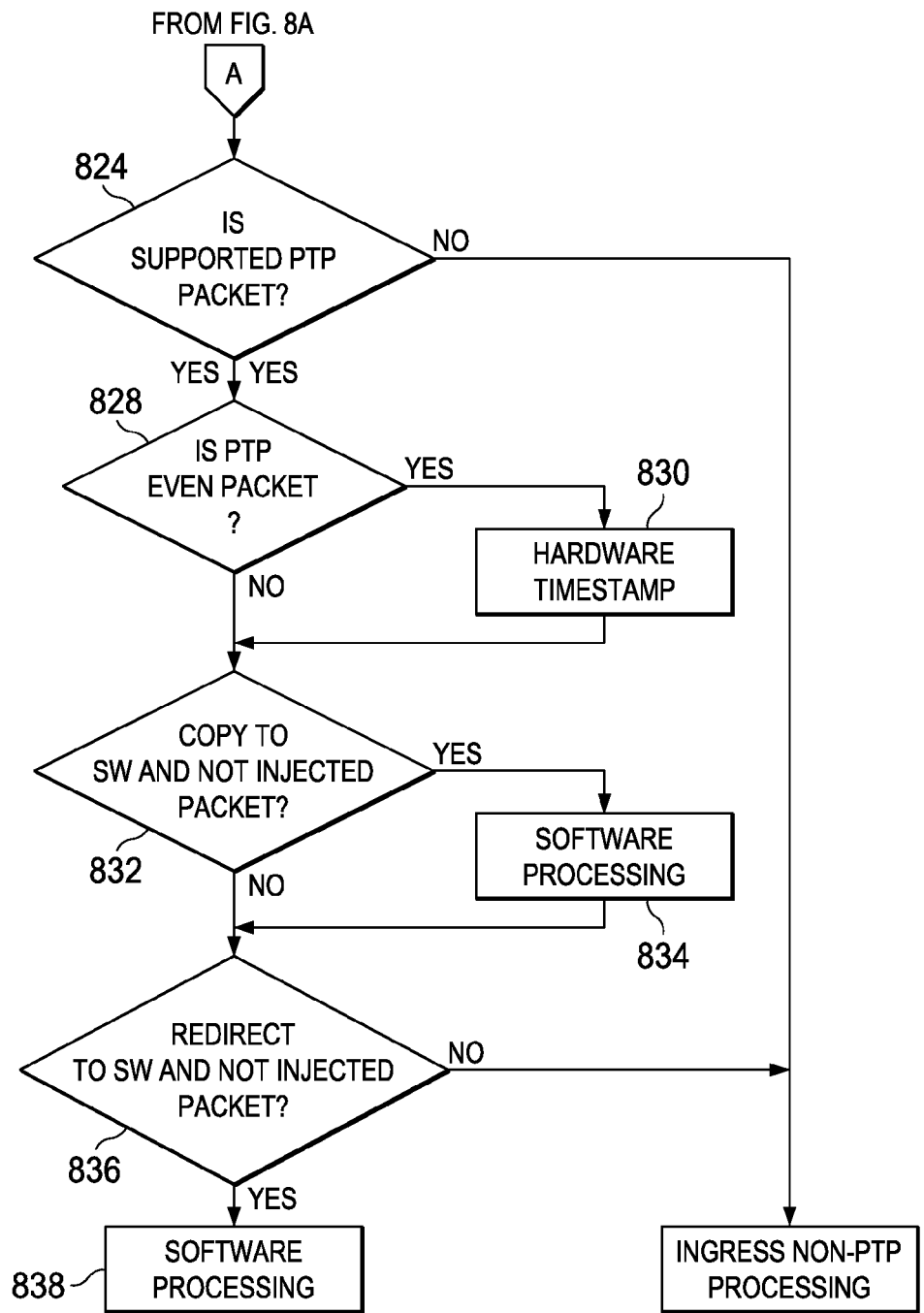

FIGS. 8A-8B are a simplified flowchart 800 illustrating potential operations that may be associated with packets ingressing network interface logic (NIL) 200 in example embodiments of the network environment. For example, in one embodiment the potential operations associated with FIGS. 8A-8B may be for packets going up from MAC 202 of FIG. 2. The operations of FIGS. 8A & 8B are similar. However, in the operations of FIG. 8A are directed to software explicitly requesting a timestamp whereas in the operations of FIG. 8B, hardware is allowed to handle timestamping through software-programmed knobs for packet field comparisons and/or ACLs. In one or more embodiments, this provides options for software to either (1) be explicit through a packet injection instruction header or (2) use hardware classification mechanisms to decide whether or not to timestamp, redirect, and/or copy a packet.

In at least one embodiment, FIG. 8A represents operations for packets that are injected in a system such as a network port or system interface. In a particular embodiment, probe packets can be either sourced from a host or injected into the system by software through writing one or many such packets into a packet injection FIFO that stores the packet injection instructions as well as the packet itself. In at least one embodiment, the operations of FIG. 8B may be either normal front panel packets ingressing into the system and for any injected packets which are instructed to go through the normal flow.

In 802, the operations begin. In 804, an injected packet flow packet is received by NIL 200. In various embodiments, the injected packet includes packet injection instruction information that represents one or more packet instructions that instruct NIL 200 regarding how the packet should be handled. In at least one embodiment, the packet injection instruction information is contained in a header. In a particular embodiment, the packet injection instruction information includes 4 bits in which each bit may be set as follows:

(1) use_norm_flow—if set, go through hardware parsing to decide whether or not to timestamp, copy, and/or redirect the packet.

(2) tstmp—if set, software instructs hardware to always timestamp (3) copy_to_SW—if set, software instructs hardware to forward the packet and send a copy to software (4) redirect_to_SW—if set, software instructs hardware to send a copy only to software In 806, NIL 200 determines whether the packet injection instruction indicates that normal ingress flow is to be used (e.g., pk.injection_instr.use_norm_flow?). If NIL 200 determines that the packet header instruction indicates that normal ingress flow is to be used, the operations continue to 808 in which normal ingress flow operations are performed as further described with respect to FIG. 8B. If NIL 200 determines that the packet injection instruction does not indicate that normal ingress flow should be used, the operations continue to 810. In at least one embodiment, if software decides to explicitly instruct on whether to timestamp, redirect, or copy, then the packet injection instruction of injection_instr.use_norm_flow is set=0, and if software chooses to let hardware make those decisions (FIG. 8B), then injection_instr.use_norm_flow is set=1.

In 810, NIL 200 determines whether the packet injection instruction indicates that the packet should be timestamped (e.g., pkt.injection_instr.tstmp?). If the packet injection instruction indicates that the packet should be timestamped, operations continue to 812. In a particular embodiment, a packet injection instruction of injection_instr.tstmp is set=1 to explicitly instruct hardware to timestamp. In 812, a hardware timestamp is performed on the packet to stamp the packet with the current time and the operations continue to 814. In a particular embodiment, the hardware timestamping is of the form hw_timestamp(gen_signature(pkt), current_time) wherein hw_timestamp is the packet stamping function, gen_signature(pkt) is the signature generated from the packet, and current_time is the current time. In a particular embodiment, signature generation may include checksums/crcs calculated over bit-maskable fields of the packets and/or raw fields from the packet itself. If the packet injection instruction does not indicate that the packet should be timestamped, the operations continue to 814 from 810.

In 814, the NIL 200 determines whether the packet injection instruction indicates that the packet should be copied to software (e.g., pkt.injection_instr.copy_to_SW?). If the packet injection instruction indicates that the packet should be copied to software, the operations continue to 816. In 816, the packet is copied to software for software processing. In software processing a packet ends into software such as the control plane CPU. Copying the packet to software serves the purpose of letting the packet go its normal path (which eventually is ingress non-ptp processing) and also be sent to software. Copying to software is a backup option in which the packet (such as a DSync packet) goes to software together with the timestamp. This process saves the hardware from having to collect both the signature (generated off the packet including sequence number, etc.) and the timestamp into the timestamp FIFO 212 and is an alternative option. The raw Sync packet is shipped to software directly so that software can do the matching between Sync and Follow_Up. After 816, the operations continue to 818. In addition, if the packet injection instruction does not indicate that the packet should be copied to software, the operations also continue to 818.

In 818, NIL 200 determines whether the packet injection instruction indicates that the packet should be redirected to software (e.g., pkt.injection_instr.redirect_to_SW?). If the packet injection instruction indicates that the packet should be redirected to software, the operations continue to 820. In 820, the packet is redirected to software for software processing. Redirecting to software means that the packet only goes to software. Software should regenerate the frame if it is to be forwarded somewhere else. In various embodiments, software regenerates thee frame either through packet injection or through direct initiation from software. It should be noted that in various embodiments software is like a port to/from a CPU in that it is embedded inside the switch/router and it generally has its own MAC/IP address for the management and control plane. Redirection to software is suited for Follow_Up frames because those are processed by software in order to fill in the timestamps for DFollow_Up or add residence times for transparent clocks.

If it is determined in step 818 that the packet injection instruction does not indicate that the packet should be redirected to software, the operations continue to 822. In 822, ingress non-PTP processing is performed on the packet. In ingress non-PTP processing, packets undergo normal forwarding (e.g., bridging-routing-bridging) lookups. All packets going through ingress-non-PTP processing will ultimately be sent out an egress port if not dropped and the device is a switch/router. If the device is a network interface controller (NIC), then the packet will enter the host networking stack.

FIG. 8B illustrates normal ingress flow operations continuing after 808 as discussed above. After 808, the operations continue at 824 in which NIL 200 determines whether the packet is a supported PTP packet (e.g., is_supported_ptp_pkt?). If the packet is determined to not be a supported PTP packet, the operations continue to 826 in which ingress non-PTP processing is performed.

If the packet is determined to be a supported PTP packet, the operations continue to 828.

Examples for is_supported_ptp_pkt? include, but are not limited to the following:
Arbitrary ACL and/or a set of mask and match entries on any available fields:
pkt.ethertype, pkt.vlan, pkt.ip_prot_nh,
pkt.tcp.src_port, pkt.tcp.dst_port, pkt.tcp_flags, pkt.tcp_offset, pkt.tcp_mf, pkt.udp.src_port, pkt.udp.dst_port,
pkt.1588.header_4 bytes
interface (at virtual interface granularity)

At 828, NIL 200 determines whether the packet is a PTP event packet (e.g., is_ptp_event_pkt?). In one or more embodiments, determining whether the packet is a PTP event packet is based on mask and match and/or an access control list (ACL). An example previously discussed herein is UDP port number 319, but it can be more complicated to accommodate other types of packets. If the packet is determined to be a PTP event packet, the operations continue to 830.

Examples of is_ptp_event_pkt?, copy_to_sw?, redirect_to_sw? include but are not limited to the following:
Arbitrary ACL and/or can be independent sets of mask and match entries on any available fields:
pkt.tcp.src_port, pkt.tcp.dst_port,
pkt.udp.src_port, pkt.udp.dst_port,
pkt.1588.header_messageId
pkt.1588.header_control
interface (at virtual interface granularity)

At 830, a hardware timestamp is performed on the packet to stamp the packet with the current time and the operations continue to 832. In a particular embodiment, the hardware timestamping is of the form hw_timestamp(gen_signature (pkt), current_time). If the packet is determined not to be a PTP event packet, the operations continue to 832 from 828.

At 832, NIL 200 determines whether the packet includes a packet injection instruction to copy to software and whether it is a packet injected by software (e.g., copy_to_sw && !is_injected_pkt?). If the packet includes a packet injection instruction to copy to software and if the packet is not a packet injected by software, the operations continues to 834 in which the packet is copied to software for software processing. The qualification of requiring that the packet is not a packet injected by software is to avoid loops in the operations. If a packet is injected by software (such as described with respect to FIG. 8A) and then sent back to software, a perpetual loop may be formed. After 834, the operations continue to 836. If there is no copy to software packet injection instruction in the packet or if the packet was injected by software, the operations continue to 836.

At 836, NIL 200 determines whether the packet includes a packet injection instruction to redirect to software and whether it is a packet injected by software (e.g., redirect_to_sw && !is_injected_pkt?). If the packet includes a packet injection instruction to redirect to software and if the packet is not a packet injected by software, the operations continues to 838 in which the packet is redirected to software for software processing. Again, the qualification of requiring that the packet is not a packet injected by software is to avoid loops in the operations. If there is no redirect to software packet injection instruction in the packet or if the packet was injected by software, the operations continue to 826 in which ingress non-PTP processing is performed as discussed above.

Figure 9:
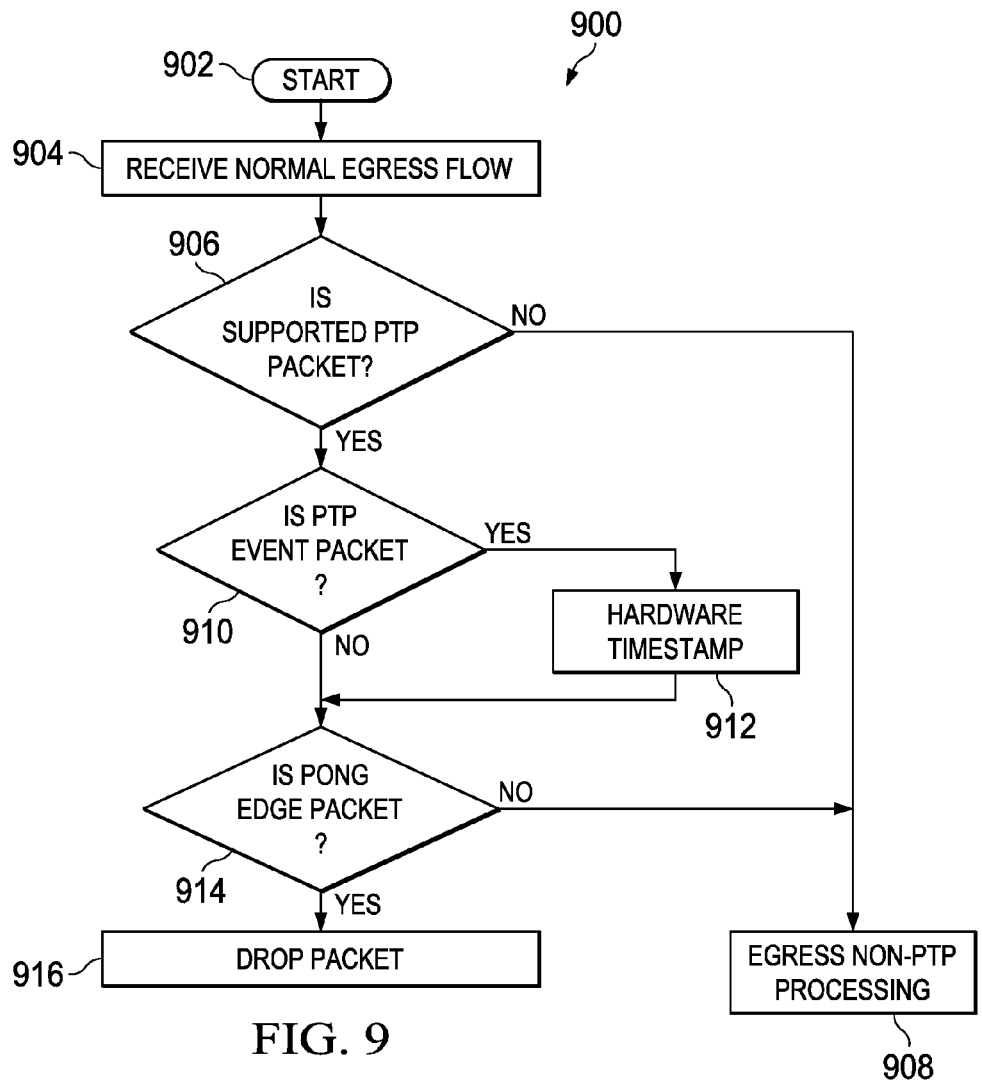
FIG. 9 is a simplified flowchart illustrating potential operations that may be associated with packets egressing network interface logic (NIL) in example embodiments of the network environment.

FIG. 9 is a simplified flowchart 900 illustrating potential operations that may be associated with packets egressing network interface logic (NIL) 200 in example embodiments of the network environment. For example, in one embodiment the potential operations associated with FIG. 9 may be for packets going down towards MAC 202 of FIG. 2. In 902, the operations begin. In 904, a normal egress flow packet is received by NIL 200. In 906, NIL 200 determines whether the packet is a supported PTP packet (e.g., is_supported_ptp_pkt?). If the packet is not a supported PTP packet, the operations continue to 908 in which egress non-PTP processing is performed. In egress non-PTP processing, packets exit out of the output interface (e.g., egress port of a switch/router). If the packet is a supported PTP packet, the operations continue to 910 from 906.

In 910, NIL 200 determines whether the packet is a PTP event packet (is_ptp_event_pkt?). If the packet is a PTP event packet, the operations continue to 912 in which a hardware timestamp is performed on the packet to stamp the packet with the current time and the operations continue to 914. In a particular embodiment, the hardware timestamping is of the form hw_timestamp(gen_signature(pkt), current_time). If the packet is determined not to be a PTP event packet, the operations continue to 914 from 910.

At 914, NIL 200 determines whether the packet is a pong edge packet (is_pong_edge_pkt?). If the packet is a pong edge packet the operations continue to 916, in which the packet is dropped.

Examples for is_pong_edge_pkt? include, but are not limited to, the following:
    Arbitrary ACL and/or can be a set of mask and match entries on any available fields:
        pkt.mac_da
        pkt.ip_da
        pkt.tcp.src_port, pkt.tcp.dst_port,
        pkt.udp.src_port, pkt.udp.dst_port,
        pkt.1588.header_messageId
        pkt.1588.header_control
        interface (at virtual interface granularity)

If the packet is not a pong edge packet, the operations continue to 908 in which egress non-PTP processing is performed as described above.

It should be understood that in other embodiments, the packet match and mask operations may be performed earlier such as in the port logic (because security logic 204 can encrypt the packet) for egressing packets and that mask and match information may be passed onwards as additional sideband information with the packet in which case the sideband is not sent out of the line interface.

Although embodiments have been described in which timestamping is performed at each interface of a network element, it should be understood that in other embodiments timestamping can also include internal interfaces within a system such as between ASICs and even within an ASIC on internal interface boundaries.

As described herein, network environment 100 can provide many significant advantages, some of which have already been discussed. For example, network environment 100 provides systems and methods for frame handling to provide a timestamping infrastructure, and for monitoring and characterizing network health through instrumentation of probe frames across the network and collection of arrival and departure times and paths over time. Moreover, network environment 100 may provide this information in a protocol agnostic fashion, and the information may be monitored and dynamically processed, or stored for subsequent data mining. Port-to-port and link measurements may be provided without end host assistance, although an end host can be a source and/or destination of probe and probe follow-up frames. Thus, network environment 100 provides a rich set of measurement points not restricted by IP end nodes and protocol. Hardware-based timestamping can increase measurement accuracy. Entire paths can be measured with a single probe packet per direction and a corresponding follow-up per direction. Application-level treatment of probe frames can provide accurate path selection and QoS.

Advantageously, metric measurement may be any traffic, not just probe packets, and does not need to be encapsulated in an ICMP packet. Metric measurements may consist of two frames in a two-step process where the second frame can be processed by the control plane, thus eliminating dynamic modification of measurement messages at ingress ports. A metric measurement in network environment 100 do not require an external source, as it is sourceable by an ingress port itself with associated semantics for arbitrating between ingress and injected traffic. Metric measurements may also be terminated at an edge egress port within network environment 100 with associated drop counter statistics, rather than looped back, and may be re-injected in the reverse direction as an independent frame. Measurement semantics may include timestamp collection for frames, which do not have to arrive from ingress and depart egress ports, such as internal diagnostic frames, injected, and/or dropped frames. Timestamps may be carried within a packet, with signature mechanisms to track and match frames without re-writing on the packet.

In some embodiments, in-band or inline processing is used during receipt, transmission, and calculating of timestamps of tracked packets. In at least one embodiment, no out-of-band processing is required or needed. In some embodiments, an advantage is offered in which some calculations, such as calculation of timestamps, are almost instantaneous and of very high precession. In at particular embodiment, the recording of a timestamp of a message is performed in-line with the transmitting of the message.

Note that with the examples provided above, as well as numerous other examples provided herein, interaction might be described in terms of two, three, or four network elements. However, this has been done for purposes of clarity and example only. In certain cases, it may be easier to describe one or more of the functionalities of a given set of flows by only referencing a limited number of network elements. It should be appreciated that network environment 100 (and its teachings) are readily scalable and can accommodate a large number of components, as well as more complicated/sophisticated arrangements and configurations. Accordingly, the examples provided should not limit the scope or inhibit the broad teachings of network environment 100 as potentially applied to a myriad of other architectures. Additionally, although described with reference to particular scenarios, where a particular module, such as a participation level module, is provided within a network element, these modules can be provided externally, or consolidated and/or combined in any suitable fashion. In certain instances, such modules may be provided in a single proprietary unit.

It is also important to note that the operations in the appended diagrams illustrate only some of the possible signaling scenarios and patterns that may be executed by, or within, network environment 100. Some of these operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network environment 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for tracking packets in a network to monitor health of the network, comprising:
   transmitting a message from a first port of a first network element via a second network element to a second port of a third network element;
   recording a first timestamp of the message at the first network element relative to a first clock associated with the first network element;
   recording a second timestamp of the message at the second network element relative to a second clock associated with the second network element;
   recording a third timestamp of the message at the third network element relative to a third clock associated with the third network element, wherein the message is terminated and regenerated at the second clock and the third clock;
   transmitting a first follow-up message from the first port to the second port to collect and append the first timestamp, the second timestamp, and the third timestamp to the first follow-up message, wherein the appended first follow-up message includes: a header portion having an insertion code field indicative of either a hop-by-hop timestamp insertion mode or an endpoint timestamp insertion mode, and a record count field indicative of a number of timestamps included within the first follow-up message; a first timestamp record including a first port identifier associated with the first timestamp, a first format field indicative of a format associated with the first port identifier, and the first timestamp; a second timestamp record including a second port identifier associated with the second timestamp, a second format field indicative of a format associated with the second port identifier, and the second timestamp; and a third timestamp record including a third port identifier associated with the third timestamp, a third format field indicative of a format associated with the third port identifier, and the third timestamp, wherein the first follow-up message is a negotiated message;
   transmitting a loopback message from the second port to the first port;
   recording timestamps of the loopback message at each clock between the second port and the first port; and
   transmitting a second follow-up message from the second port to the first port to collect and append the timestamps of the loopback message at each clock.

2. The method of claim 1, wherein the message being transmitted is a probe message.

3. The method of claim 1, wherein the message being transmitted is a probe message injected at an interface of a network element.

4. The method of claim 3, wherein the interface of the network element includes one or more of an ingress port of a switch, an ingress port of a router, and an egress port of a network interface card.

5. The method of claim 1, wherein the message being transmitted is a probe message terminated and regenerated at the first clock and the second clock.

6. The method of claim 1, wherein the first and second follow-up messages are precision time protocol messages.

7. The method of claim 1, wherein the first and second follow-up messages are precision time protocol messages each comprising a sequence identifier, a time stamp header, and time stamp records.

8. The method of claim 1, wherein:
   the message is a probe message terminated and regenerated at the first clock and the second clock; and
   the first and second follow-up messages are precision time protocol messages each comprising a sequence identifier, a time stamp header, and time stamp records.

9. The method of claim 1, wherein the recording of the timestamps of the message is performed in-line with the transmitting of the message.

10. Logic encoded in one or more non-transitory, tangible media that includes code for execution and when executed by a processor operable to perform operations for tracking packets in a network to monitor health of the network comprising:
    transmitting a message from a first port of a first network element via a second network element to a second port of a third network element;
    recording a first timestamp of the message at the first network element relative to a first clock associated with the first network element;
    recording a second timestamp of the message at the second network element relative to a second clock associated with the second network element;
    recording a third timestamp of the message at the third network element relative to a third clock associated with the third network element, wherein the message is terminated and regenerated at the second clock and the third clock;
    transmitting a first follow-up message from the first port to the second port to collect and append the first timestamp, the second timestamp, and the third timestamp to the first follow-up message, wherein the appended first follow-up message includes: a header portion having an insertion code field indicative of either a hop-by-hop timestamp insertion mode or an endpoint timestamp insertion mode, and a record count field indicative of a number of timestamps included within the first follow-up message; a first timestamp record including a first port identifier associated with the first timestamp, a first format field indicative of a format associated with the first port identifier, and the first timestamp; a second timestamp record including a second port identifier associated with the second timestamp, a second format field indicative of a format associated with the second port identifier, and the second timestamp; and a third timestamp record including a third port identifier associated with the third timestamp, a third format field indicative of a format associated with the third port identifier, and the third timestamp, wherein the first follow-up message is a negotiated message;
    transmitting a loopback message from the second port to the first port;
    recording timestamps of the loopback message at each clock between the second port and the first port; and
    transmitting a second follow-up message from the second port to the first port to collect and append the timestamps of the loopback message at each clock.

11. The logic of claim 10, wherein the message being transmitted is a probe message.

12. The logic of claim 10, wherein the message being transmitted is a probe message terminated and regenerated at the second clock and the third clock.

13. The logic of claim 10, wherein the first and second follow-up messages are precision time protocol messages.

14. The logic of claim 10, wherein the first and second follow-up messages are precision time protocol messages each comprising a sequence identifier, a time stamp header, and time stamp records.

15. The logic of claim 10, wherein:
the message is a probe message terminated and regenerated at the second clock and the third clock; and
the first and second follow-up messages are precision time protocol messages each comprising a sequence identifier, a time stamp header, and time stamp records.

16. The logic of claim 10, wherein the recording of the timestamps of the message is performed in-line with the transmitting of the message.

17. An apparatus for tracking packets in a network to monitor health of the network, comprising:
a memory element configured to store data,
a processor operable to execute instructions associated with the data, and
a tracking module, the apparatus being configured to:
transmit a message from a first port of a first network element via a second network element to a second port of a third network element;
record a first timestamp of the message at the first network element relative to a first clock associated with the first network element;
record a second timestamp of the message at the second network element relative to a second clock associated with the second network element;
record a third timestamp of the message at the third network element relative to a third clock associated with the third network element, wherein the message is terminated and regenerated at the second clock and the third clock;
transmit a first follow-up message from the first port to the second port to collect and append the first timestamp, the second timestamp, and the third timestamp to the first follow-up message, wherein the appended first follow-up message includes:
a header portion having an insertion code field indicative of either a hop-by-hop timestamp insertion mode or an endpoint timestamp insertion mode, and a record count field indicative of a number of timestamps included within the first follow-up message; a first timestamp record including a first port identifier associated with the first timestamp, a first format field indicative of a format associated with the first port identifier, and the first timestamp; a second timestamp record including a second port identifier associated with the second timestamp, a second format field indicative of a format associated with the second port identifier, and the second timestamp; and a third timestamp record including a third port identifier associated with the third timestamp, a third format field indicative of a format associated with the third port identifier, and the third timestamp, wherein the first follow-up message is a negotiated message;
transmit a loopback message from the second port to the first port;
record timestamps of the loopback message at each clock between the second port and the first port; and
transmit a second follow-up message from the second port to the first port to collect and append the timestamps of the loopback message at each clock.

18. The apparatus of claim 17, wherein the message being transmitted is a probe message.

19. The apparatus of claim 17, wherein the message being transmitted is a probe message terminated and regenerated at the second clock and the third clock.

20. The apparatus of claim 17, wherein the first and second follow-up messages are precision time protocol messages.

21. The apparatus of claim 17, wherein the first and second follow-up messages are precision time protocol messages each comprising a sequence identifier, a time stamp header, and time stamp records.

22. The apparatus of claim 17, wherein:
the message is a probe message terminated and regenerated at the second clock and the third clock; and
the first and second follow-up messages are precision time protocol messages each comprising a sequence identifier, a time stamp header, and time stamp records.

23. The apparatus of claim 17, wherein the recording of the timestamps of the message is performed in-line with the transmitting of the message.

* * * * *